United States Patent [19]

Payne

[11] Patent Number: 5,293,028
[45] Date of Patent: Mar. 8, 1994

[54] COOKTOP APPLIANCE WITH IMPROVED POWER CONTROL

[75] Inventor: Thomas R. Payne, Louisville, Ky.

[73] Assignee: General Electric Company, Louisville, Ky.

[21] Appl. No.: 426

[22] Filed: Jan. 5, 1987

[51] Int. Cl.$^5$ .............................................. H05B 1/02
[52] U.S. Cl. ...................................... 219/486; 219/492; 219/485; 219/506; 219/508; 323/319
[58] Field of Search ......................... 219/483–486, 219/497, 492, 501, 505, 508–510; 307/38–41; 323/235, 319, 321

[56] References Cited

U.S. PATENT DOCUMENTS

| | | | |
|---|---|---|---|
| 3,646,577 | 2/1972 | Ernst | 219/241 |
| 3,956,978 | 5/1976 | Borley | 219/502 |
| 4,010,412 | 3/1977 | Forman | 219/486 |
| 4,233,498 | 10/1980 | Payne et al. | 219/490 |
| 4,256,951 | 3/1981 | Payne et al. | 219/492 |
| 4,282,422 | 8/1981 | Payne et al. | 219/486 |
| 4,334,147 | 6/1982 | Payne | 219/497 |
| 4,400,613 | 8/1983 | Popelish | 219/497 |
| 4,404,461 | 9/1983 | Sitek et al. | 219/490 |
| 4,443,690 | 4/1984 | Payne et al. | 219/506 |

FOREIGN PATENT DOCUMENTS

| | | |
|---|---|---|
| 0033499 | 1/1981 | European Pat. Off. . |
| 0197604 | 3/1988 | European Pat. Off. . |
| 3204599 | 9/1983 | Fed. Rep. of Germany . |
| 3516788 | 11/1986 | Fed. Rep. of Germany . |
| 3517953 | 11/1986 | Fed. Rep. of Germany . |
| 2388450 | 4/1977 | France . |
| 713454 | 8/1954 | United Kingdom . |
| 818371 | 8/1959 | United Kingdom . |
| 920406 | 3/1963 | United Kingdom . |
| 1199264 | 7/1970 | United Kingdom . |
| 2041673 | 10/1980 | United Kingdom . |
| 2120471 | 11/1983 | United Kingdom . |
| 2121247 | 12/1983 | United Kingdom . |
| 2159009 | 11/1985 | United Kingdom . |
| 2167277 | 5/1986 | United Kingdom . |
| 2176665 | 12/1986 | United Kingdom . |

*Primary Examiner*—Mark H. Paschall
*Attorney, Agent, or Firm*—H. Neil Houser

[57] ABSTRACT

A cooking appliance adapted for energization by a standard domestic household power supply employs a power control arrangement which accommodates electric resistive heating units designed for operation at a maximum RMS voltage level less than the RMS voltage level of the output power signal of the domestic power supply. The power control system couples power pulses from the external power supply to the heating unit at one of a plurality of available pulse repetition rates, each repetition rate establishing a corresponding RMS voltage level for application of power to the heating unit. The repetition rate associated with the maximum user selectable power setting for the appliance is effective to apply an RMS voltage level to the heating unit which corresponds to the voltage level for which the heating unit was designed. When a heating unit is turned from Off to On the power control system overdrives the unit at full supply voltage for a brief transient heat up period to rapidly heat the unit to its radiant temperature. The duration of this heat up period is controlled as a function of the elapsed time since the unit was last turned Off.

12 Claims, 13 Drawing Sheets

COOKTOP APPLIANCE WITH IMPROVED POWER CONTROL

BACKGROUND OF THE INVENTION

This invention relates generally to glass-ceramic cooktop appliances and particularly to electronic power control systems for such appliances.

Use of glass-ceramic plates as cooktops is well known. Advantages of the smooth surface include pleasing appearance and easy cleanability. Glass-ceramic cooktop appliances using heating units which radiate substantially in the infrared region in combination with a glass-ceramic material which is transparent to such radiation provides the appearance and convenience advantages of conventional thermal conduction type glass-ceramic cooktops plus the additional advantage of greater energy efficiency and improved cooking performance due to a faster response to changes in user selected power settings.

Infrared heating units employ resistance wire elements designed to radiate primarily in the 1–3 micron region of the electromagnetic spectrum. The total output power and watts density parameters for the heating elements in such units is dictated by cooking performance requirements. For domestic appliances the power supply available in the home is generally the line voltage from the local power company. In the United States this is typically 120 and 240 volts. Resistance wire heating elements designed to provide the desired power and watts density at these voltages are constructed of relatively small diameter delicate expensive wire. Significant cost advantages could be enjoyed if the wire diameter could be increased thereby increasing the structural integrity of the wire and making it possible to use a less costly wire material. However, with the power and watts density constrained by cooking performance requirements, any increase in wire diameter must be compensated for by a decrease in voltage. In view of the high current required to provide the desired power, a step-down transformer would be impractical from both a size and cost standpoint.

Thus, to enjoy the benefits of a less costly, more reliable infrared heating unit there is a need for a cost effective practical energy efficient means of reducing the effective voltage applied to the heating units to an effective voltage level less than a domestic line voltage.

Another consequence of increasing wire diameter is that the time required for the wire to reach its radiant temperature is increased. Infrared heating units, at least when operating at or near the maximum user selected power setting, glow brightly. This glow is perceivable by the user through the glass-ceramic cooktop. This glow can be advantageously used to provide prompt visual feedback to the user that the selected unit is operating properly. One such arrangement for rapidly bringing a heating element to its radiating temperature to provide this feedback using commercially available heating elements made of molybdenum disilicide ($MoSi_2$) or tungsten heating elements is disclosed in commonly assigned U.S. Pat. No. 4,223,498. In that arrangement the unit is driven at the power level associated with the maximum user selectable power setting for a brief period when first turned on, regardless of the actual user selected setting to quickly heat the unit to its radiating temperature.

Since the heating element with the increased wire diameter was designed for operation at a lower effective or RMS voltage, the heat up time can be reduced to an acceptable time by briefly over-driving the heating element at full line voltage. However, the overdrive time must be carefully limited to avoid over-stressing the wire. For example, if the unit is turned off and then on again before it has cooled sufficiently, applying the full line voltage for a time period which has no adverse affect on the wire when heating up from room temperature may damage the pre-heated wire. Use of wire temperature feedback information is impractically costly and complex. Thus, in a system in which the heating elements are designed primarily for operation at voltage levels less than the full line voltage, there is a need for a power control arrangement which can provide an overdrive capability for the elements when turned on but which can adjust the overdrive time to compensate for the past temperature history of the element.

In a multiple element cooktop appliance featuring heating units with elements designed for operation at a voltage stepped down from the normal line voltage, overdriving the elements at full line voltage for short periods of time may draw excessive total current. Household electrical service generally employs a 50 amp breaker in the power circuit for the main kitchen cooking appliances. In a four-unit cooktop appliance for example, the total current is limited by conventional design practice to a maximum level of 35 amps leaving 15 amps for the oven. Since this limit could be exceeded if one or more of the heating units is overdriven depending on the power levels being applied to the remaining units, there is a need for a power control arrangement which can adjust the overdrive power levels to maintain the total current drawn by the heating units within design limits, while still heating the units to radiating temperature relatively quickly to provide the desired visual feedback to the user.

It is therefore an object of the present invention to provide an electric cooking appliance comprising at least one electric heating unit and a power control system which applies an effective voltage level to the heating unit at the maximum user selectable power setting for the unit which is less than the PMS voltage of the domestic power supply so as to accommodate in the appliance heating units designed for maximum steady state operation at a voltage level less than the domestic supply voltage.

It is a further object of the present invention to provide a cooking appliance of the aforementioned type in which the power control system is operative to overdrive the heating units when initially turned on by applying a voltage level higher than the maximum user selectable level for a brief transient heat up period, the duration of which is limited as a function of the elapsed time since the last occurring use of the particular heating unit to avoid overheating a heating unit which is not yet cooled down from its previous use.

It is yet another object of the present invention to provide a cooktop appliance of the aforementioned type in which the power control system is operative to reduce the power level applied to the surface units during operation in the transient heat up period as necessary to maintain the total current drawn by the appliance within predetermined limits.

SUMMARY OF THE INVENTION

The present invention provides a cooking appliance adapted for energization by a standard domestic household power supply characterized by an output power signal with a predetermined RMS output voltage, the appliance comprising at least one electric resistive heating unit designed for steady state energization at a maximum RMS voltage level less than the RMS voltage level of the output power signal of the external power supply. User actuable input selection means enables the user to select one of a plurality of power settings including an Off setting for the heating unit. Power control means responsive to the input selection means is operative to couple power pulses from the external power supply to the heating unit at one of a plurality of available pulse repetition rates, each user selectable power setting having associated with it a corresponding power pulse repetition rate, each repetition rate establishing a corresponding RMS voltage level for application of power to the heating unit. The repetition rate associated with the maximum user selectable power setting is effective to apply on RMS voltage level to the heating unit which corresponds to the voltage level for which the heating unit was designed. By this arrangement the appliance can be equipped with heating units designed for operation at a voltage level less than the normal supply voltage, yet which provide the output power and watt density normally associated with heating units designed to operate at the normal domestic supply voltages.

In accordance with another aspect of the invention, the power control means includes timing means for measuring the elapsed time since the unit was last turned off by the user, and means for detecting the transition from an Off power setting to one of the non-Off power settings. Upon detection of such a transition the power control means is operative to implement a power pulse repetition rate which establishes an RMS voltage level for the heating unit which is higher than the maximum user selectable level, and preferably equal to the RMS voltage level of the external power supply output signal, for a transient heat up period. The duration of this transient heat up period is controlled as a function of the elapsed time since the unit was last turned off as determined by the timing means whereby the heating unit is protected against damage from overheating in the event sufficient time has not elapsed for it to cool since its last occurring use.

In accordance with yet another aspect of the invention, particularly applicable to a cooking appliance comprising multiple heating units designed for steady state energization at a maximum RMS voltage level less than the RMS voltage level of the power signal from the external supply, the power control means further comprises means for determining when the total current drawn by the heating units exceeds a predetermined reference limit and means for reducing the effective voltage level applied to each of the heating units to reduce the total current to less than this limit. In a preferred form of the invention, each of the power pulse repetition rates implementable by the control means is assigned numerical designator. The means for determining when the total current exceeds the reference limit comprises means for computing the sum of the numerical designators corresponding to the power pulse repetition rates then being applied to each heating unit and comparing this sum to a predetermined reference value corresponding to the maximum acceptable total current for the heating units. The control means is operative to lower the repetition rate being applied to each of the heating units until this sum is less than the reference value. The control means is further operative to extend the duration of the transient heat up period for heating units operating in the transient heat up mode when the repetition rate being applied to such units is lowered, so as to compensate for the reduction in the effective voltage level applied to the overdriven units so that the heating units are still heated to radiating temperature relatively quickly to provide the desired visual feedback to the user.

While the novel features of the invention are set forth with particularity in the appended claims, the invention both as to organization and content will be better understood and appreciated from the following detailed description taken in conjunction with the drawings.

DETAILED DESCRIPTION OF THE ILLUSTRATIVE EMBODIMENT

Overview

Figure 1:
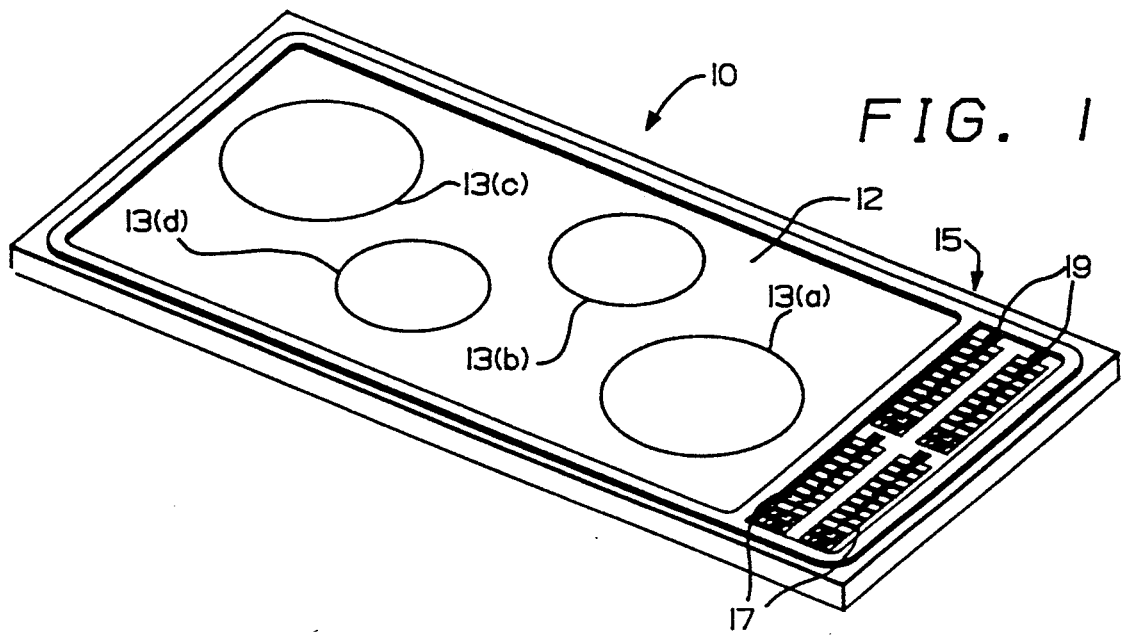
FIG. 1 is a perspective view of a portion of a cooktop illustratively embodying the power control system of the present invention.

FIG. 1 illustrates a glass-ceramic cooktop appliance designated generally 10. Cooktop appliance 10 has a generally planar glass-ceramic cooking surface 12. Circular patterns 13(a)–13(d) identify the relative lateral positions of each of four heating units (not shown) located directly underneath surface 12. A control and display panel generally designated 15 includes a complete set of touch control keys 17 and a seven-segment digital LED display element 19 for each heating unit.

The term glass-ceramic with reference to the material comprising cooktop surface 12 refers to a boron silicate material in the Ceran family of materials. In particular in the illustrative embodiment the glass-ceramic material is an infrared transmissive glass-ceramic material designated Ceran-85 manufactured by Schott, Incorporated.

Figure 2:
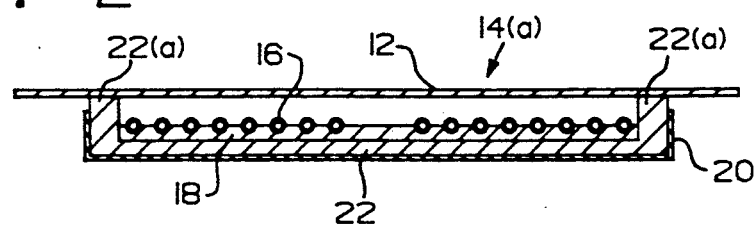
FIG. 2 is a sectional side view of a portion of the cooktop of FIG. 1 showing details of one of the heating units.
Figure 3:
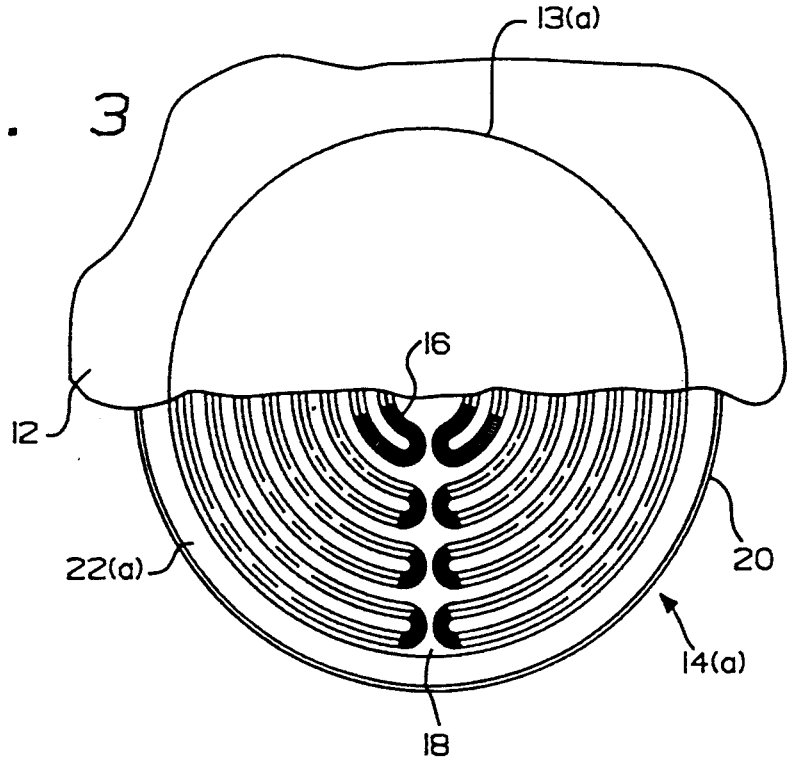
FIG. 3 is an enlarged top view of a portion of the cooktop of FIG. 1 showing details of the heating unit.

In the discussion to follow the designators 14(a)-14(d) shall be understood to refer to the heating units disposed under patterns 13(a)-13(d) respectively. Surface unit 14(a) is shown in greater detail in FIGS. 2 and 3. For purposes of illustration only one of the heating units is shown. It will be understood that heating units 14(b)-14(d) are similar in structure to that shown in FIGS. 2 and 3. Heating units 14(a) and 14(c) are 8 inches in diameter. Units 14(b) and 14(d) are 6 inches in diameter.

Referring again to FIGS. 2 and 3, heating unit 14(a) comprises an open coil electrical resistance element 16 of spiral configuration, which is designed when fully energized to radiate primarily in the infrared (1-3 micron) region of the electromagnetic energy spectrum. Element 16 is arranged in a concentric coil pattern and staked or otherwise secured to a support disk 18 formed of Micropore material such as is available from Ceramaspeed under the name Microtherm. Disk 18 is supported in a sheet metal support pan 20, by an insulating liner 22 formed of a conventional aluminum oxide, silicon oxide composition. This insulating liner 22 includes an annular upwardly extending portion 22(a) which serves as an insulating spacer between disk 18 and the underside of glass-ceramic cooktop 12. When fully assembled, pan 20 is spring loaded upwardly forcing the annular portion 22(a) of insulating liner 22 into abutting engagement with the underside of cooktop 12 by support means not shown. Heating units 14(a)-14(d) are manufactured and sold commercially by Ceramaspeed under the part name, Fast Start Radiant Heater with Concentric Coil Pattern.

Figure 4:
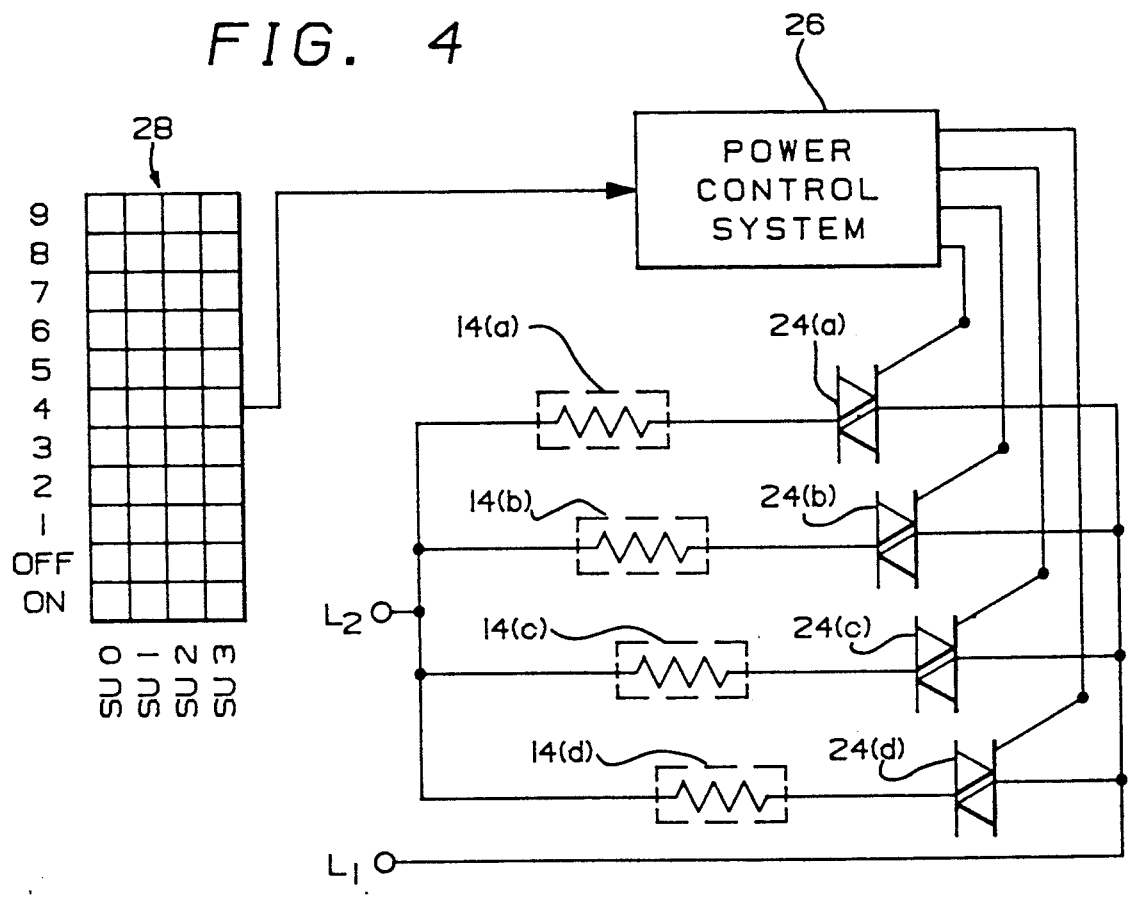
FIG. 4 is a functional block diagram of the power control circuitry for the cooktop of FIG. 1.

FIG. 4 illustrates in simplified schematic form, an embodiment of a heating system to be controlled in accordance with the present invention. Each of four heating units 14(a)-14(d) is coupled to a standard 240 volt, 60 Hz AC power source via power lines L1 and L2 through one of four triacs 24(a)-24(d) respectively, the heating circuits being connected in parallel arrangement with each other. Triacs 24(a)-24(d) are conventional thyristors capable of conducting current in either direction irrespective of the voltage polarity across their main terminals when triggered by either a positive or negative voltage applied to the gate terminals.

The power control system 26 controls the power applied to the heating units by controlling the rate at which gate pulses are applied to the triac gate terminals in accordance with power setting selections for each heating unit entered by user actuation of tactile tough membrane switch keyboard 28 comprising tough keys 17 (FIG. 1). The columns of keys designated SU0 through SU3 provide the control inputs for heating units 14(a)-14(d) respectively.

In the illustrative embodiment gate signals are applied to triacs 24(a)-24(d) to couple power pulses to the heating units. Each pulse is a full cycle of the 240 volt, 60 Hz AC power signal; however, power signals of different frequencies and voltage levels such as 120 volts, 60 Hz or 220 volts, 50 Hz could be similarly used.

A plurality of discrete power levels are provided, each having uniquely associated with it a particular power pulse repetition rate. In the illustrative embodiment fifteen non-Off power levels are implementable by the control system. Nine power settings corresponding to power levels 1-9, plus Off and On are selectable for each heating unit by user actuation of the keys in keyboard 28. The six highest power levels designated A-F are not user selectable. These levels are used to overdrive the heating units when operating in a transient heat up mode to rapidly heat the units to radiant temperature as will be hereinafter described. Table I shows the pulse repetition rate associated with each power level.

TABLE I

| Power Settings | Power Level | Power Pulse Repetition Rate | Look Up Table Address | Power Pulse Code | | | | Watts |
|---|---|---|---|---|---|---|---|---|
| OFF | 0 | — | TBLADDR | 0000 | 0000 | 0000 | 0000 | 0 |
| ON | 0 | — | TBLADDR | 0000 | 0000 | 0000 | 0000 | 0 |
| 1 | 1 | 1/64 | TBLADDR +8 | 8000 | 0000 | 0000 | 0000 | 60/40 |
| 2 | 2 | 1/32 | TBLADDR +10 | 8000 | 0000 | 8000 | 0000 | 120/75 |
| 3 | 3 | 1/16 | TBLADDR +18 | 8000 | 8000 | 8000 | 8000 | 230/150 |
| 4 | 4 | 1/8 | TBLADDR +20 | 8080 | 8080 | 8080 | 8060 | 400/275 |
| 5 | 5 | 10/64 | TBLADDR +28 | 8088 | 8080 | 8088 | 8080 | 650/425 |
| 6 | 6 | 15/64 | TBLADDR +30 | 8888 | 8888 | 8888 | 8880 | 875/600 |
| 7 | 7 | 21/64 | TBLADDR +38 | AA88 | A888 | A888 | A888 | 1225/800 |
| 8 | 8 | 28/64 | TBLADDR +40 | AA8A | AA8A | AA8A | AA8A | 1650/1100 |
| 9 | 9 | 36/64 | TBLADDR +48 | EAAA | EAAA | EAAA | EAAA | 2100/1400 |
| | A | 41/64 | TBLADDR +50 | EEEA | EAEA | EAEA | EAEA | 2400/1600 |
| | B | 45/64 | TBLADDR +58 | EEEE | AEEE | EAEE | EEAE | 2650/1750 |
| | C | 51/64 | TBLADDR +60 | FEEE | EEEF | FEEE | FEEE | 2900/1900 |
| | D | 55/64 | TBLADDR +68 | FEFE | FEFE | FEFE | FEEF | 3150/2100 |
| | E | 59/64 | TBLADDR +70 | FFEF | FEFF | EFFE | FFEF | 3400/2250 |
| | F | 64/64 | TBLADDR +78 | FFFF | FFFF | FFFF | FFFF | 3700/2450 |

The power pulse code in Table I represents 64-bit control words in hexadecimal format. These control words are used to implement the corresponding pulse repetition rates. The basic control period comprises 64 full cycles of the 60 Hz power signal. The distribution of ON power pulses over this 64 cycle control period for each power setting is defined by the bit pattern of the associated control word. ON pulses or cycles are represented by logical one bits and Off cycles by logical zero bits respectively. The repetition rates for the user selectable power settings have been empirically established to provide a range of power settings for good cooking performance in the appliance of the illustrative embodiment. The bit patterns have been selected to minimize the duration of idle or OFF cycles for each power level.

Figure 5:
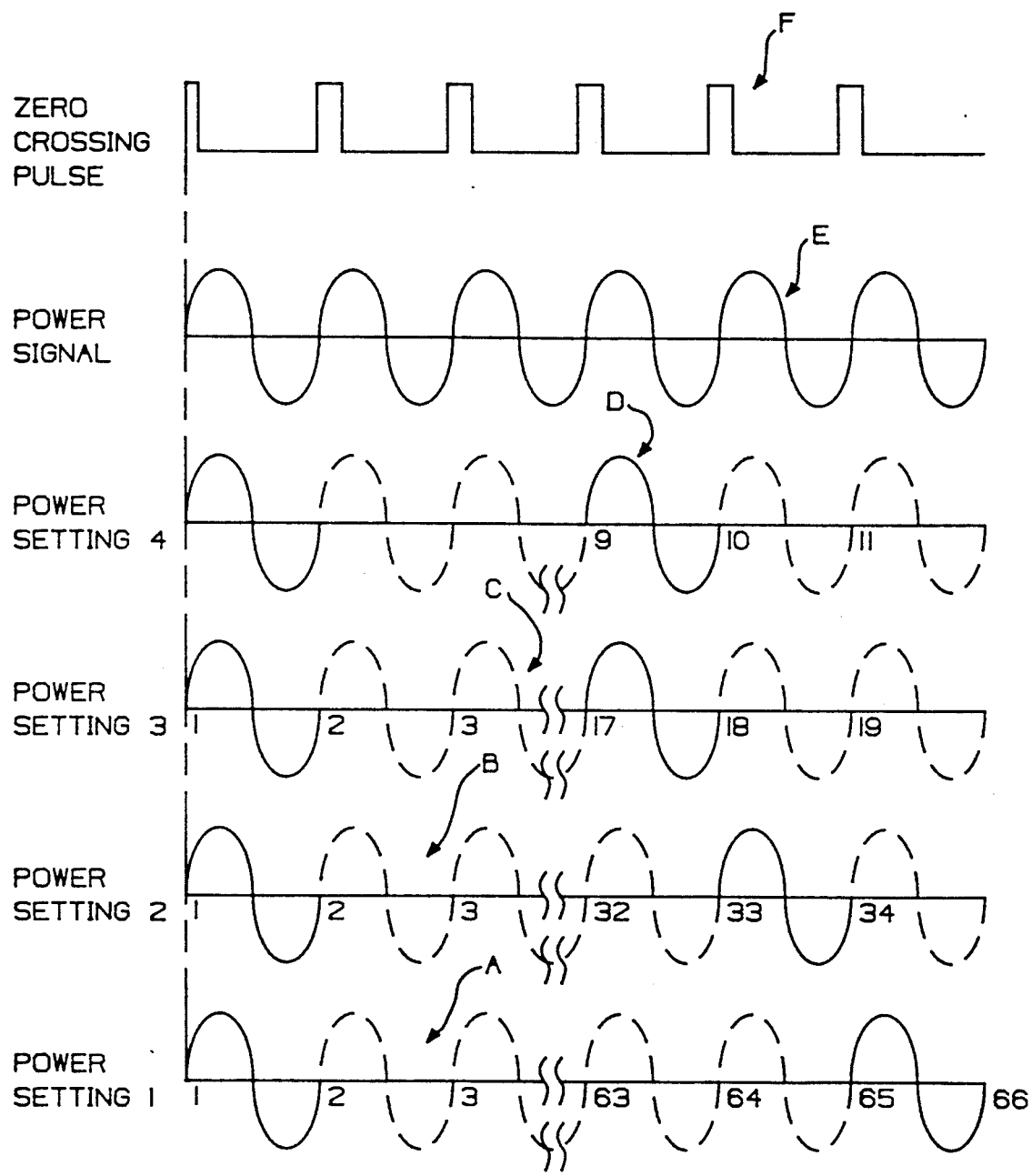
FIG. 5 illustrates power signals corresponding to various operator selectable power settings and a timing signal for sychronizing control system operation with the power signal.

As shown in Table I, the pulse repetition rate for the first four power settings range from 1 ON pulse per 64 power cycles for power setting 1, the lowest non-Off power setting, to 1 ON power pulse for every 8 cycles for power level 4. In FIG. 5 waveforms A–D represent the voltage applied to heating element for each of power settings 1 through 4 respectively. Wave form E represents the power signal appearing across lines L1 and L2. Power pulses or ON cycles are represented by full lines. Those cycles of the power signal during which the triac is non-conductive are shown in phantom lines.

One aspect of the present invention involves a novel application of the repetition rate power control concept disclosed in commonly assigned U.S. Pat. No. 4,256,951. As mentioned briefly in the Background discussion, significant cost and reliability benefits can be enjoyed if the appliance can accommodate heating units designed for operation at an effective or RMS voltage level less than the 240 volt supply level. As used hereinafter the phrase "designed for operation at a particular voltage" with reference to a heating unit shall be understood to mean that the unit is designed to provide the maximum output power and watts density desired for good cooking performance when that particular effective or RMS voltage is applied to the unit. A reduction of the effective voltage for which the unit is designed permits an increase in heating element wire diameter to provide better structural integrity without compromising on the power and watts density specifications essential to good cooking performance.

Heating element wire manufacturers have determined that a less costly, structurally stronger, heating unit which provides the output power and watts density normally associated with the heating element designed to operate at line voltages can be designed for operation at about 75% of line voltage. For example, a unit can be designed for operation at 180 volts RMS which provides the output power and watts density normally associated with a unit designed to operate at 240 volts RMS. Similarly, a unit can be designed to operate at 90 volts RMS and provide the output power and watts density normally associated with a unit designed to operate at 120 volts RMS.

In accordance with the present invention the RMS voltage applied to the heating unit is effectively stepped down from the typical supply line voltage of 240 volts to the voltage level for which the unit is designed by determining the repetition rate which provides an RMS voltage equal to the design voltage and assigning this rate to the maximum user selectable power setting.

Repetition rate control can be used to step down the effective or RMS voltage applied to the heating unit, provided the time base is properly selected, because when power switching is conducted at a switching rate which provides On and Off times which do not exceed the same order of magnitude as the thermal time constant of the wire heating material, the voltage in terms of heating effect or output power is approximately equal to the RMS value of the supply voltage reduced by a factor equal to the square root of the ratio of the number of On cycles to the total number of cycles in the control period. This relationship is expressed in the equation listed below.

$$V_{RMS} = V_{peak} \times \sqrt{\frac{1}{2} \times \left(\frac{\text{Number of on cycle}}{\text{Total Cycles in Control Period}}\right)}$$

The thermal time constant of heating element wire is on the order of 800 milliseconds, varying slightly with wire radius. Thus, a control period of 64 cycles is of the same order of magnitude as the thermal time constant for the heating unit of the illustrative embodiment. Using the foregoing equation, a ratio of 36 On cycles to 64 total cycles provides an effective RMS voltage of 180 volts for the peak supply voltage of 339 volts associated with the standard 240 volt RMS 60 HZ domestic supply.

As shown in Table I the maximum user selectable power setting in the illustrative embodiment is power setting 9. The corresponding power level is defined by a repetition rate of 36 On cycles per 64 total control period cycles.

One undesirable consequence of heating units designed to operate at lower voltage levels is that the increased wire diameter extends the time required to heat the wire to its visually radiating temperature when operated at the voltage level corresponding to the maximum user selectable power setting. For example, in the illustrative embodiment the time required for the unit designed for operation at 180 volts to reach the visible radiating temperature at power level 9 is on the order of 30 seconds. For purposes of prompt visual feedback to the user this is undesirably slow. A heat up time not significantly greater than 4-6 seconds is preferred. To this end, in accordance with another aspect of the present invention, upon detecting a change in power setting from Off to a non-Off power setting, an overdrive power level higher than the power level associated with the maximum user selectable setting is applied to the unit for a relatively short transient heat up period of time, long enough to bring the heating unit to its radiating temperature quickly but not so long as to subject the unit to excessive thermal stress.

In the illustrative embodiment when the heating element wire is at or near room temperature, the unit can be operated at full line voltage for up to 5 seconds without undue stress on the wire. However, if the unit is turned from Off to On without sufficient time to allow the unit to cool adequately from a previous On period, operation of the unit at full power for the normal 4–5 seconds could, if repeated over a period of time, lead to a premature failure of the unit. To protect against such damage, in accordance with the present invention timing means is provided to measure the Off time, that is the elapsed time since the last occurring OFF setting was selected by the user. The power control system is operative in response to the timing means to vary the duration of the next occurring transient heat up period as a function of Off time so as to establish a shorter heat up period when the elapsed time indicates that the wire has not had adequate time to cool since a previous usage.

In the illustrative embodiment the timing means compares the elapsed time to three successively increasing reference times. The transient heat up period is selectively limited to one of four corresponding predetermined heat up time periods, the selected one of the time periods corresponding to the longest of the reference times to be exceeded. The predetermined reference times are 3 seconds, 14 seconds, and 60 seconds. If the unit has been turned Off for less than approximately 3 seconds, the overdrive power level is applied for approximately 1 second; if the Off time is greater than 3 but less than 14 seconds, the overdrive power level is applied for approximately 2 seconds; if the Off time is greater than 14 but not greater than 60 seconds; the overdrive power level is applied for approximately 3 seconds; and finally if the elapsed Off time is greater than 60 seconds, the overdrive power level is applied for approximately 4 seconds.

These specific reference times and heat up periods have been found to provide satisfactory results for the heating units of the illustrative embodiment. It will be appreciated, however, that these values are provided for purposes of illustration and are not to be considered as limitations on the invention.

Overdriving the heating unit at an overdrive power level corresponding to full line voltage or 100% power brings the heating unit to its radiating temperature quickly. However, in a multiple unit cooktop such as that of the illustrative embodiment, the maximum current which can be drawn by the appliance at a given time is limited, thereby limiting the total output power available from the heating units. This current limit may be exceeded by applying full line voltage in the heat up mode depending on what power levels are set by the user for the other heating units.

In view of the standard use of 50 amp circuit breakers for the domestic kitchen range power circuit, it is good design practice to limit the current to the cooktop to approximately 35 amps. Assuming supply voltage variations of ±10% and ±5% variation in the resistance of the heating units the extreme case current load is presented by a +10% voltage variation and a −5% resistance variation. A maximum current limit of 35 amps at 264 volts +10%) defines a maximum output power limit of 9240 watts for the four unit cooktop.

In accordance with the present invention means are provided for determining when the total current being drawn by the heating units is greater than a predetermined limit, and for reducing the voltage from full line voltage to a lower voltage level to bring the total current load within acceptable limits.

In a preferred from of the invention the means for detecting excess current computes a sum representing the maximum output power of the appliance for the power levels then being applied to each of the heating units. When this sum exceeds a predetermined maximum value, power levels are adjusted until the sum is less than the reference. In the illustrative embodiment the implementable repetition rates are represented by the corresponding numerical power level designators. The power level designators are summed and compared to a reference value representing the power level sum corresponding to the maximum power limit. Output power data for each of the six inch and eight inch units for the cooktop of the illustrative embodiment under both the nominal and extreme tolerance conditions are listed in Table II for the maximum user selectable power settings 8 and 9 and the top three power levels available during operation in the transient heat up mode.

TABLE II

| Power Level | 6" Unit | | 8" Unit | |
|---|---|---|---|---|
| | Nominal | Extreme | Nominal | Extreme |
| 8 | 1100 | 1380 | 1650 | 2065 |

TABLE II-continued

| Power Level | 6" Unit | | 8" Unit | |
|---|---|---|---|---|
| | Nominal | Extreme | Nominal | Extreme |
| 9 | 1400 | 1780 | 2100 | 2670 |
| D | 2100 | 2730 | 3150 | 4090 |
| E | 2250 | 2910 | 3400 | 4370 |
| F | 2450 | 3170 | 3700 | 4750 |

Using the data from Table II for extreme voltage and resistance conditions, with all four units operating at the power level corresponding to the maximum user selectable power level, power level 9, the total combined output power for the two 6" and two 8" units is 8900 watts. This is 340 watts less than the above defined maximum power limit of 9240 watts. As can be seen in Table II, a one power level change, particularly with respect to the top three power levels, corresponds to approximately three to four hundred watts difference in output power for a single heating unit. Thus this 340 watt difference corresponds to a power level change of approximately one power level.

In the illustrative embodiment with all four heating units operating at power level 9 the sum of the power levels is 36. This sum represents the maximum output power value of 8900 watts. An increase of one additional power level for one surface unit would place the total output power at approximately the maximum desirable limit of 9240 watts. Thus a maximum power level sum of 37 would meet the maximum power and corresponding current limit requirements under all possible operating conditions. However, a power level sum of 38 satisfactorily meets the maximum power conditions under all operating conditions reasonably likely to occur. Thus, 38 is employed in the illustrative embodiment as a reference value for the reference maximum sum of power levels for the appliance. No adjustments to the power level applied to any of the heating units is made to limit the current until the sum of the power levels exceeds the total 38.

For example assume one 8" heating unit is operating in the transient heat up mode with the maximum overdrive power level, power level F, being applied and the remaining three heating units are operating at the maximum user selectable power level, power level 9. The sum of the power levels in this case is 42 and the total output power is 10980 watts. Reducing the power level of each heating unit by one level lowers the sum to 38 and lowers the total output power to 9195 watts which is slightly less than the allowable maximum of 9240 watts.

In order to limit the effect on any one heating unit, the power level for each of the heating units may be lowered to bring the total current within limits. In the illustrative embodiment, in order to further limit the adverse affect on cooking performance for those units not operating in the transient heat up mode, the power level for such units is never reduced by more than one level to comply with the current limits. If reducing the power level for all units by one level is not sufficient, the power level applied to those units operating in the transient heat up mode will be successively reduced one level at a time until the total current as signified by the power level sum is within acceptable limits. The power control system is operative in response to this lowering of the power level being applied during transient heat up mode to correspondingly increase the duration of the transient heat up period to compensate for the lower power levels being applied.

Microprocessor Embodiment

Figure 6:
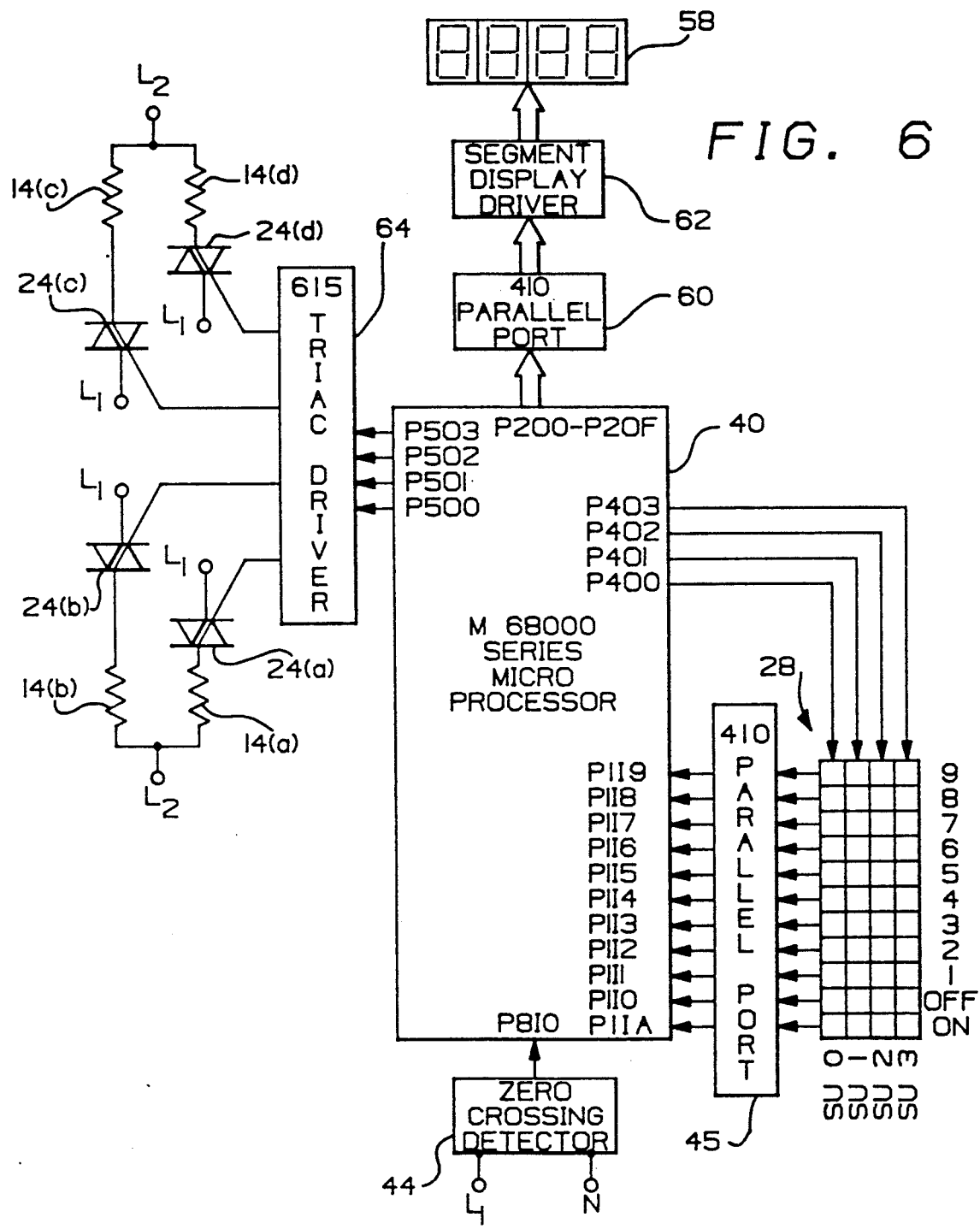
FIG. 6 is a simplified schematic diagram of a control circuit illustratively embodying the power control system of the present invention as embodied in the cooktop of FIG. 1.

FIG. 6 schematically illustrates an embodiment of a power control circuit for the cooktop of FIG. 1 which performs power control functions in accordance with the present invention. In this control system power control is provided electronically by microprocessor 40. Microprocessor 40 is a M68000 series microprocessor of the type commercially available from Motorola. Microprocessor 40 has been customized by permanently configuring its read only memory to implement the control scheme of the present invention.

As previously described with referenced to FIG. 4, keyboard 28 is a conventional tactile touch type entry system. The keyboard array comprises four columns of 11 keys each. Columns for controlling heating elements are designated SU0 through SU3 respectively. The keys enable a user to select power levels 1 through 9 in addition to On and Off for each of the four heating units. Keyboard 28 has one input line for each column commonly shared by all keys in that column and 11 output lines, one for each row of keys. Each particular column of keyboard 28 is scanned by periodically generating scan pulses sequentially at outputs P400 through P403 of microprocessor 40. These pulses are transmitted as they appear to the corresponding column input lines of keyboard 28. This voltage is transmitted essentially unchanged to the output lines of all of the untouched keys. The output of an actuated key will differ, signifying actuation of the key in that row and column.

In this manner each column of keyboard 28 is scanned for a new input periodically at a rate determined by the control program stored in the ROM of microprocessor 40. As will become apparent from the description of the control routines which follow, each column is scanned once every four complete power cycles of the powder signal appearing on lines L1 and N. The output from keyboard 28 is coupled to input ports P110–P11A of microprocessor 40 via a 410 parallel port interface circuit.

A zero crossing signal marking zero crossings of the power signal appearing on lines L1 and N from the power supply is input to microprocessor 40 at input port P810 from a conventional zero crossing detector circuit 44. The zero crossing signal from circuit 44 is illustrated as wave form F of FIG. 5. The pulses mark the position going zero crossings of the power signal across lines L1 and N of the AC power supply. The zero crossing signals are used to synchronize the triggering of the triacs with zero crossings of the power signal and for timing purposes in the control program executed by microprocessor 40.

Microprocessor 40 transmits triac trigger signals from I/O ports P500 through P503 to the gate terminals of triacs 24(a)–24(d) respectively via a conventional 615 triac driver circuit. Triac driver circuit 64 amplifies the outputs from ports P500–P503 of microprocessor 40 and isolates the chip from the power line. Display data is transmitted from I/O ports P200–P20F. Display 58 is a conventional four digit display, each digit comprising a 7-segment LED display. Display information is coupled from I/O ports P200–P20F to the display segments via a conventional 410 parallel port interface circuit 60 and a conventional segment display decoder driver circuit 62 in a manner well known in the art.

Control Program

It will be recalled that microprocessor 40 is customized to perform the control functions of this invention by permanently configuring the ROM to implement a predetermined set of instructions. FIGS. 7-13, are flow diagrams which illustrate the control routines implemented in microprocessor 40 to obtain, store and process the input data from the keyboard and generate control signals for triggering the triacs in a manner which provides the power pulse repetition rate required to apply appropriate power levels to each of the heating units. From these diagrams one of ordinary skill in the programming art could prepare a set of instructions for permanent storage in the ROM of microprocessor 40 which would enable the microprocessor to perform the control functions in accordance with this invention.

The control program comprises a set of predetermined control instructions stored in the read only memory (ROM) of microprocessor 40. A separate file in the random access memory (RAM) of the microprocessor is associated with each of heating units 14(a)–14(d). Each file stores the control information for its associated heating unit which is acted upon by the instructions in the ROM. Execution of the control program is synchronized with the 60 Hz power signal such that the set of control instructions in the ROM is cycled through once during each cycle of the power signal. A file register common to all four files functioning as a four count ring counter is incremented once during each pass through the control program. The count of this file register identifies the RAM file to be operated on by the control instructions during the ensuing pass through the control program. By this arrangement the control program is executed for any one particular heating unit once every four cycles of the 60 Hz power signal.

The control program is logically divided into a set of sub-routines which includes the Scan routine, the Keyboard Decode routine, the Off Timer routine, the Instant On routine, the PSFT routine, the Power Out routine, and the PwrSum routine. It will be appreciated the other sub-routines may also be included to perform control functions unrelated to the present invention.

The Scan routine (FIG. 7), which contains the file register identifying the RAM file to be acted upon during the ensuing pass through the control program, sets the scan line for the keyboard column associated with the heating unit which is the subject of the current pass through the routine, reads the input from the keyboard for that heating unit, and stores the user selected power setting selection information in temporary memory. The Keyboard Decode routine (FIGS. 8A and 8B) validates keyboard entries and updates the control variable representing the power level selected by the user as appropriate to reflect the most recent valid user input for that heating unit. The Off Timer routine (FIG. 9) determines the time elapsed since that heating unit was last turned off. This information is used in the Instant On routine (FIGS. 10A and 10B) to vary the duration of the transient heat up period during which the unit is overdriven as a function of how long the unit has been Off in accordance with the present invention.

While the determination of what power level to be applied to a heating unit is determined only during execution of the control program for that particular heating unit, a power control decision must be made for the ensuing power cycle for each of the units during each pass through the program. The PSET routine (FIG. 11) obtains power level information from each file during each pass through the routine, performs a table look-up for each heating unit to check the appropriate bit for the power level control word for each heating unit, and generates a four bit trigger control word which identifies which heating units are to be triggered on which are to be off during the next power cycle. This four bit control word is then used by Power Out routine (FIG. 12) which monitors the input from the zero crossing circuit and triggers those triacs associated with heating units to be energized during the next power cycle into conduction upon detection of the next occurring positive going zero crossing of the power signal.

The PWRSUM routine (FIG. 13) monitors the power level being applied to each of the four heating units and reduces power levels as necessary to limit the total current drawn by the appliance to within acceptable limits. Each of these control routines will now be described in greater detail with reference to its flow diagram in the discussion to follow.

Figure 7:
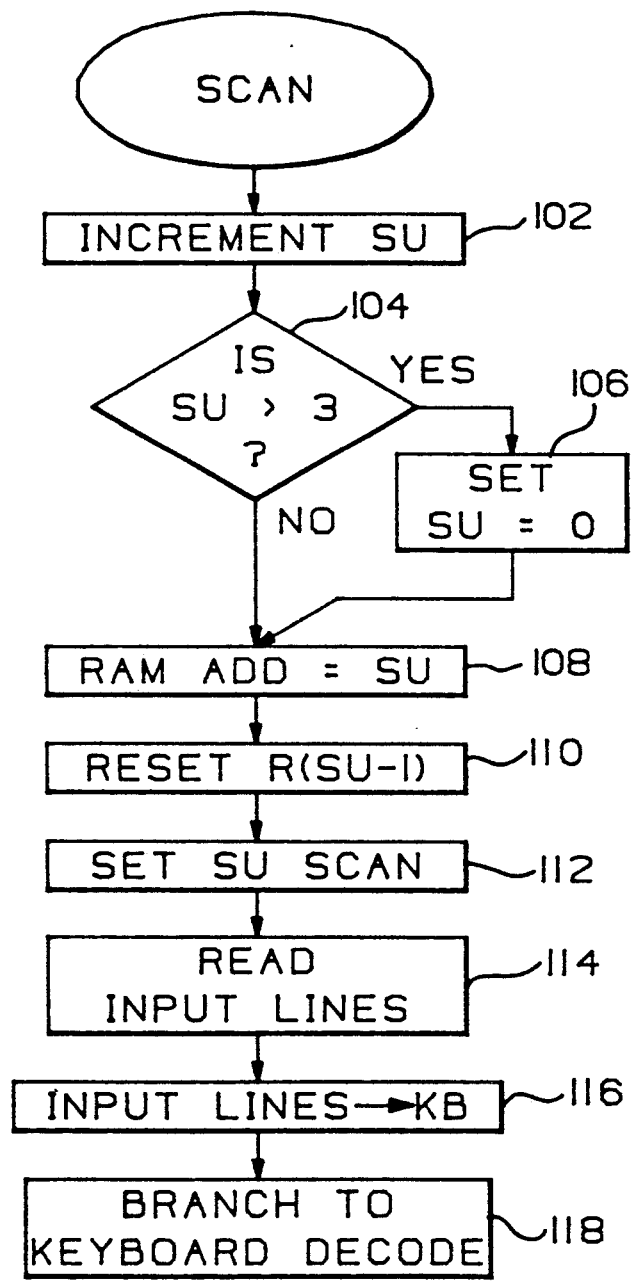
FIG. 7 is a flow diagram of the Scan routine incorporated in the control program for the microprocessor in the circuit of FIG. 6.

SCAN Routine - FIG. 7

The function of this routine is to address the appropriate RAM file for the current pass through the program, set the appropriate scan line for the keyboard, and read in the input information from the keyboard for the heating unit associated with the designated RAM file. RAM file register SU functions as a four count ring counter which counts from 0 to 3. Counts 0 through 3 of the SU counter identify RAM files for surface units 14(a)-14(d) respectively.

Upon entering the Scan routine the register SU is incremented (Block 102) and Inquiry 104 determines if SU is greater than 3. If so, the counter is reset to 0 (Block 106). Next the address of the RAM file to be acted upon during this pass through the control program is set equal to SU (Block 108). The scan line set during the previous pass through the control program designated P(SU-1) is reset (Block 110). The scan line associated with the surface unit for the current pass through the program designated R(SU) is set (Block 112). The data of input lines P11A through 9 are read in, conveying the current input information for this RAM file keyboard 28 (Block 114) and this information is stored as variable KB (Block 116). The program then branches (Block 118) to the Keyboard Decode routine of FIG. 8A.

Figure 8A:
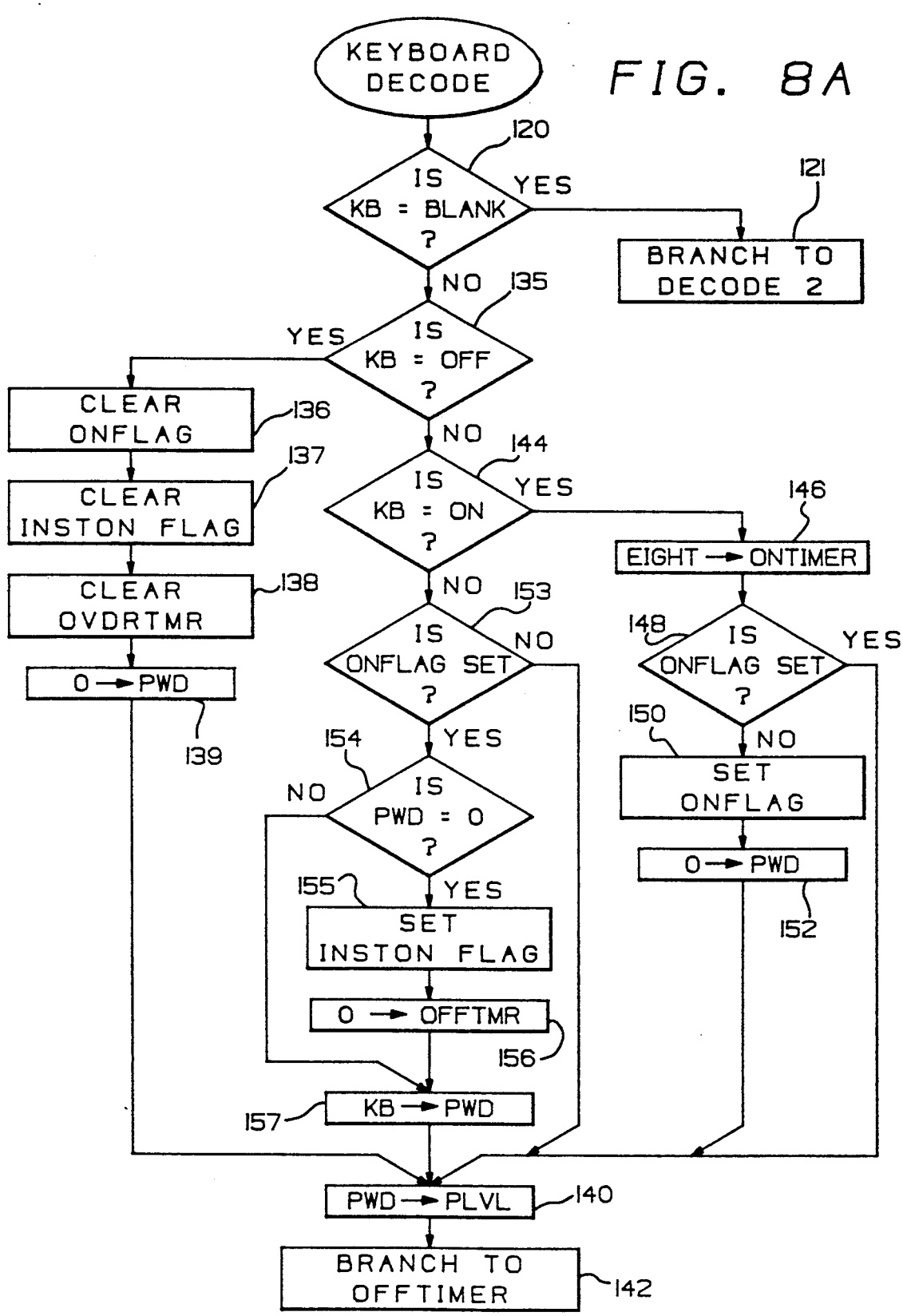
FIGS. 8A and 8B are flow diagrams of the Keyboard Decode routine incorporated in the control program for the microprocessor in the circuit of FIG. 6.
Figure 8B:
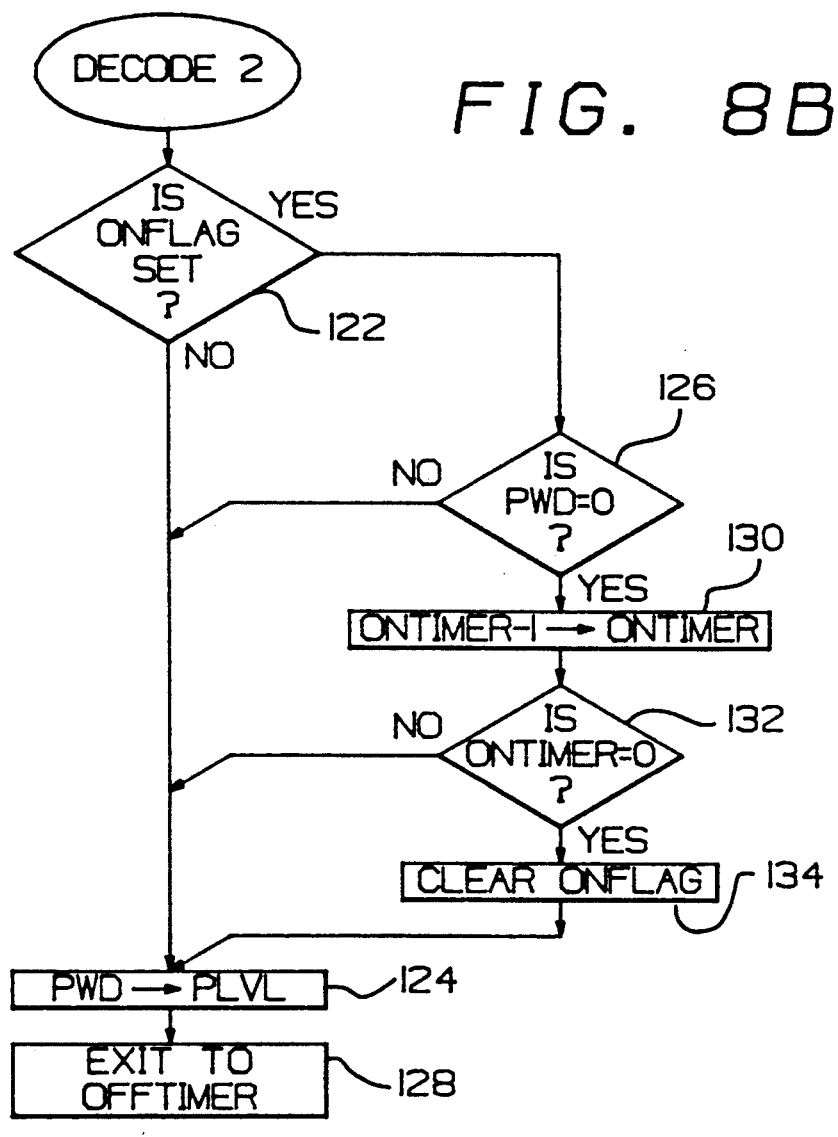

KEYBOARD DECODE Routine - FIGS. 8A and 8B

The Keyboard Decode routine validates inputs from keyboard 28 and updates the user selected power setting variable PWD accordingly. The routine first determines if the new keyboard entry is a blank signifying no input, an Off entry, an On entry, or one of the power levels 1 through 9. To be valid when switching the heating unit from Off to another power setting, the On key must be actuated first followed by the desired power setting. The power setting must be entered within 8 seconds of actuation of the On key. If not, the On key must be re-actuated.

The variable PWD represents the user selected power setting. PWD is only changed in response to user inputs. However, in accordance with the present invention the power level actually applied to the heating unit may be less than the level corresponding to the user selected power setting. The variable PLYL is introduced in this routine to represent the power level to be actually applied to the heating unit. PLYL is assigned the value of PWD in this sub-routine. However, PLYL is subject to be changed in the temperature limiting routines hereinafter described.

In the Keyboard Decode routine the eight second period for entering a valid power setting after actuation of the On key is established using a flag designated the On flag and a timer or counter designated the ON-TIMER. The On flag is set when the On key is actuated and is only reset in response to actuation of the Off key or timing out of ONTIMER.

Figure 9:
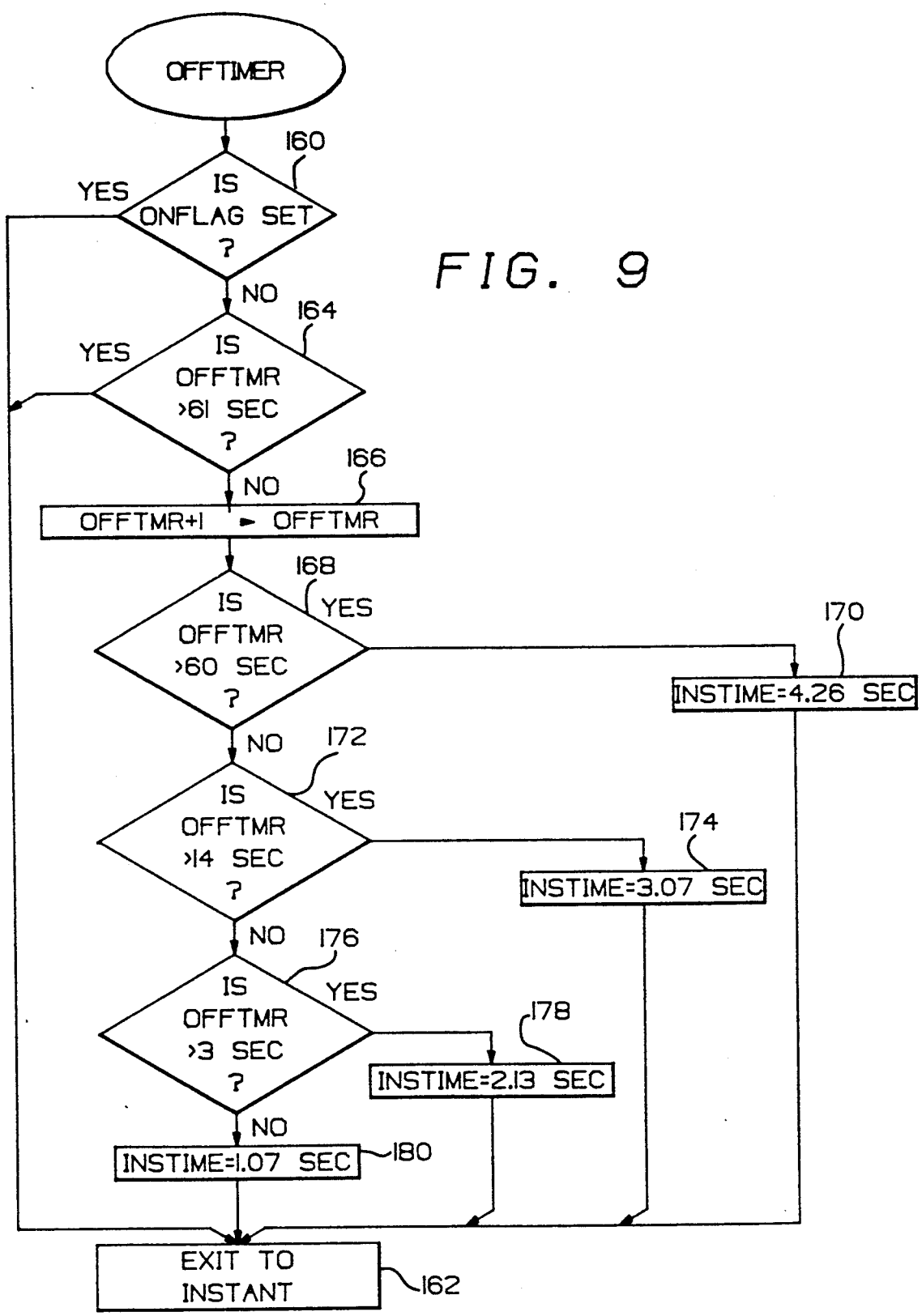
FIG. 9 is a flow diagram of the Off Timer routine incorporated in the control program of the microprocessor in the circuit of FIG. 6.

Referring to the flow diagram of FIGS. 8A and 8B, Inquiry 120 first determines if the KB represents a blank signifying that no key is presently actuated. If KB is blank, the system branches to the Decode 2 sub-routine (FIG. 8B). In the Decode 2 sub-routine Inquiry 122 determines if the On flag is set. If the On flag is not set, the power level stored in PWD is assigned to the variable PLYL (Block 124). If the On flag is set, Inquiry 126 determines if the previously selected power setting presently stored as PWD is the Off setting. If not, the system is presently operating at one of power settings 1 through 9 and the program proceeds to assign the value of PWD to PLYL (Block 124) and branches (Block 128) to the Off Time routine (FIG. 9). If Inquiry 126 determines that PWD equals 0 representing an Off power level, this indicates that the user has switched from Off to On and the On timer is decremented (Block 130). When On timer equals 0 as determined at Inquiry 132 signifying that the time to enter a valid power level has expired, the On flag is cleared (Block 134) and program proceeds to Block 124 as before.

Referring again to FIG. 8A, if KB is not a blank, Inquiry 135 determines if the new entry is the Off setting. If so, the On flag is closed (Block 136) the Instant On flag is cleared (Block 137), the Overdrive timer is cleared (Block 138), and the variable PWD is assigned the value 0 representing the Off power setting (Block 139). The variable PLYL is assigned the value of PWD (Block 140) and the program branches (Block 142) to the Off Timer routine of FIG. 9. If KB is not Off, Inquiry 144 determines if the new entry is the On setting. If it is, the On timer is re-initialized (Block 146). Inquiry 148 checks the state of the On flag. If set, the program proceeds to Block 140. If not set, the flag is set (Block 150) and the PWD is assigned the value 0 which corresponds also to the On setting (Block 152). The program then proceeds to Block 140 as before.

If the answer to Inquiry 144 is No, signifying that the new entry is one of power levels 1 through 9, Inquiry 153 checks the state of the On flag. If it is not set, signifying the user has attempted to go from Off to a power level without first actuating the On key, the new entry is ignored and the program proceeds to Block 140 with PWD unchanged. If the On flag is set, the power setting input is valid, and Inquiry 154 determines if the previous setting is an OFF setting (PWD=0). If so, the Instant On flag is set (Block 155), the OFF timer is reset (Block 156) and variable PWD is assigned the new value corresponding to the new entry KB (Block 157). If the previous setting was not OFF, the program proceeds to Block 157.

Having assigned the value of PWD representing the most recent valid user selected power setting to the variable PLYL the system proceeds to the Off Timer routine (FIG. 9).

OFF TIMER Routine - FIG. 9

The function of this routine is to measure the time elapsed since the particular unit was last turned off to establish the appropriate duration of the next occurring transient heat up period for the heating unit. A timer designated OFFTMR is provided for each heating unit. The timer is incremented by one each pass through the routine for that particular heating unit. The duration of the transient heat up period for the next occurring transient heat up period is defined by the value of the variable INSTIME. This variable is successively set equal to values of 1.07 seconds, 2.13 seconds, 3.07 seconds and 4.26 seconds as the count of the Off timer goes from less than 3 seconds to greater than 3 seconds, from greater than 3 to greater than 14 seconds, and from greater than 14 seconds to greater than 60 seconds, respectively.

Referring to the flow diagram of FIG. 9, on entering this routine the state of the On flag is checked at Inquiry 160. It will be recalled that the On flag is set in the Keyboard Decode routine hereinbefore described during the first pass through that routine following the user selection of the On key. It then remains set until the next occurring user actuation of the Off key. Thus, if the On flag is set, the system is already operating in the transient heat up mode or has completed the transient heat up mode and the value for INSTIME has already been established. Thus, when the On flag is set no adjustment to INSTIME is needed and the program branches to the Instant On routine (Block 162) of FIG. 10A. If the On flag is not set, the count of the timer (OFFTMR) is compared to a maximum count of 61 seconds at Inquiry 164. If the count is greater than 61, the program branches (Block 162) to the instant On routine of FIG. 10A. If the count represents a time that is not greater than 61 seconds, the counter is incremented by one (Block 166).

The timer is then compared to maximum reference time of 60 seconds at Inquiry 168. If the count represents a time greater than 60 seconds, the variable INSTIME is set equal to 4.26 seconds (Block 170) and the program branches to the Instant On routine. If OFFTMR is not greater than 60 seconds, the count is compared to a reference of 14 seconds at Inquiry 172. If greater than 14 seconds, the Instant On time variable INSTIME is set equal to 3.07 seconds (Block 174) and the program branches to the Instant On routine. If the count is not greater than 14 seconds, the count is compared to a reference of 3 seconds at Inquiry 176. If greater than 3 seconds, INSTIME is set equal to 2.13 seconds. If the count is not greater than 3 seconds, Instant On time variable INSTIME is set equal to 1.07 seconds (Block 180). Having established the correct reference value for the duration of the transient heat up period as a function of the Off time, the program branches to the Instant On routine of FIGS. 10A and 10B.

Figure 10A:
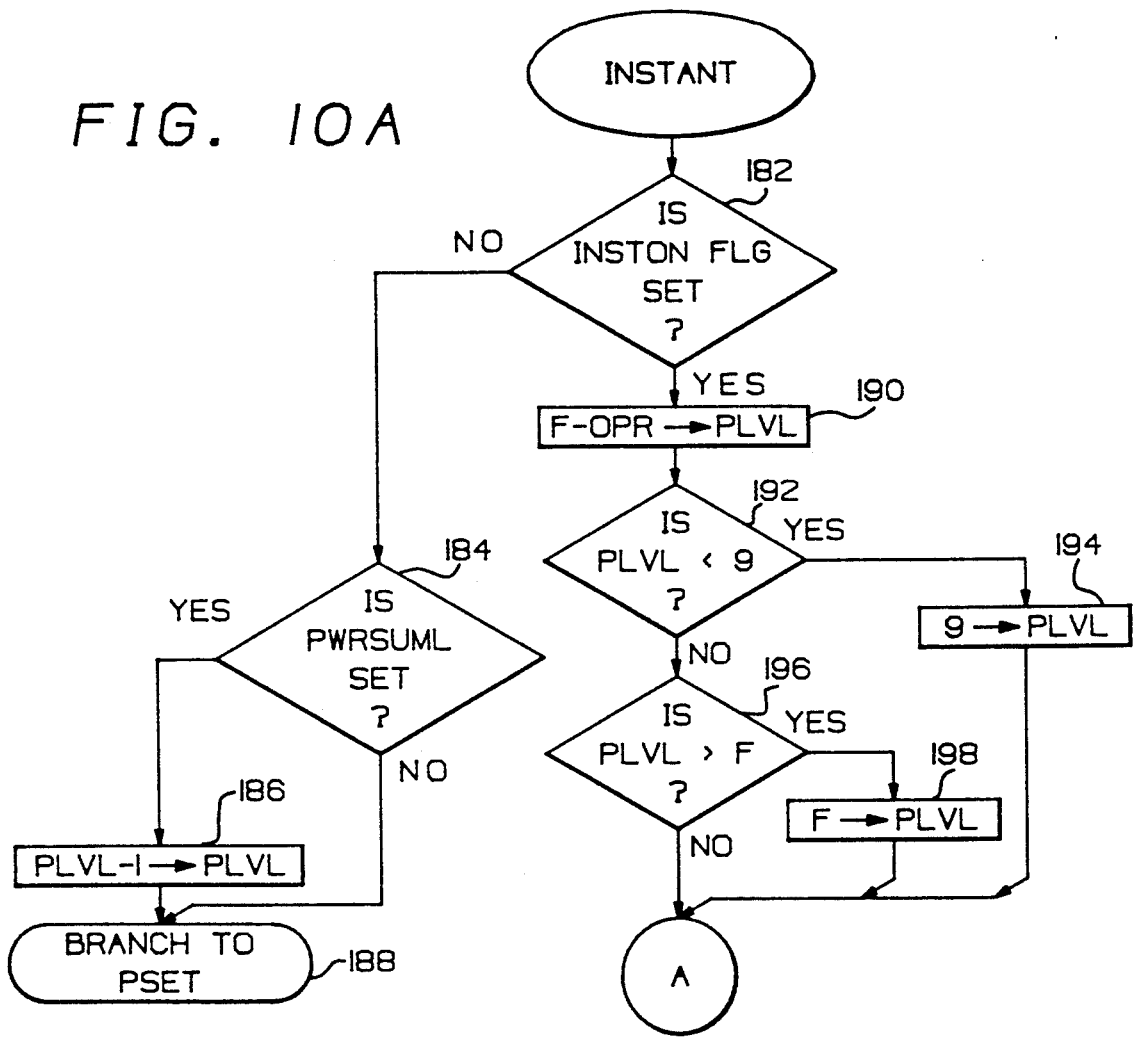
FIGS. 10A and 10B are flow diagrams for the Instant On routine incorporated in the control program of the microprocessor in the circuit of FIG. 6.
Figure 10B:
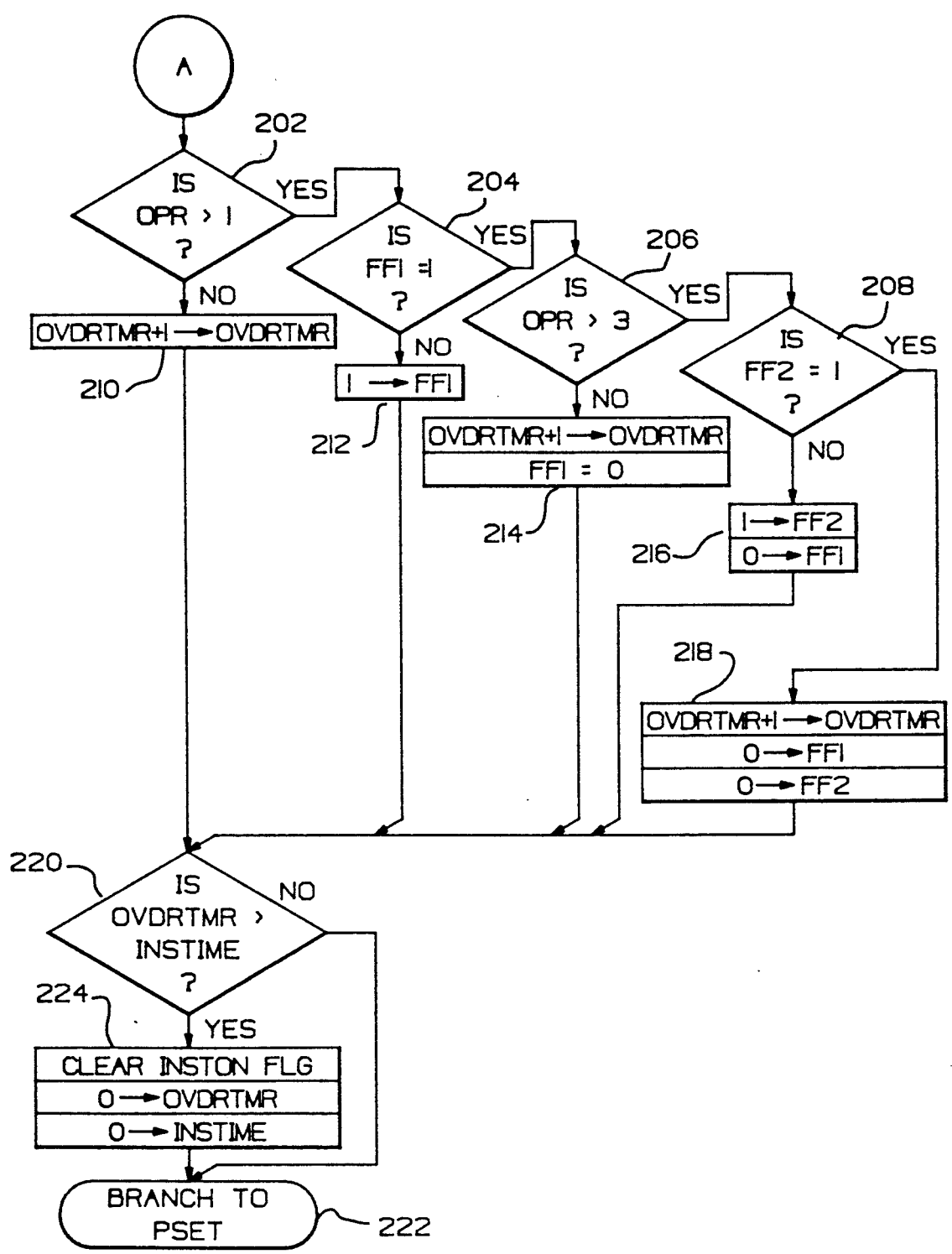

INSTANT ON Routine - FIGS. 10A and 10B

The function of the Instant On routine is to establish the appropriate overdrive power level when operating in the transient heat up mode; to control the duration of this mode; and to make adjustments to the power level when not operating in this mode as required to limit the total current drawn by the appliance.

It will be recalled that under certain conditions the sum of the power levels may exceed the predetermined limits signifying that the appliance is drawing too much current this determination is made in the PWRSUM routine hereinafter described with reference to FIG. 13. A latch designated PWRSUML, is set in that routine when the sum of the power levels is greater than a reference value. When PWRSUML is set, power level adjustments are made in this routine during each ensuing pass through the control program for each heating unit until the sum of the power levels is no longer greater than the reference.

Additionally, a variable designated OPR is used to make adjustments in power level to be applied to heating units in the transient heat up mode and to vary the duration of this mode. More specifically when the transient heat up power level is reduced in order to meet the current limit requirements, the duration of the transient heat up period is correspondingly extended. The value of OPR is established in the PWRSUM routine but it is used in this routine to make the appropriate power level and time adjustments for units operating in the Instant On routine.

Referring now to FIGS. 10A and 10B, on entering this routine the state of the Instant On flag is checked at inquiry 182. If it is not set, signifying the unit for which the change is being executed is not operating in the transient heat up mode, the state of the power sum latch (PWRSUML) is checked at inquiry 184. If PWRSUML is set, signifying a need to adjust the power level to meet current limitation requirements the power level is reduced by one (Block 186) and the program branches to the next routine. If PWPSUML is not set no adjustments are made and the program continues on to the next routine.

Referring back to Inquiry 182, if Instant On flag is set signifying operation in the Instant On mode, the power level variable PLYL is set equal to the maximum power level F, reduced as required by the value of the adjustment variable OPR (Block 190). Inquiry 192 and Block 194 cooperate to prevent the applied power level during Instant On from being less than 9 and Inquiry 196 and Block 198 cooperate to keep PLYL not greater than F. The program then proceeds to inquiries 202-208 which operate in combination with Blocks 210-218 to vary the duration of the transient heat up mode as a function of the value of the OPR variable. A counter designated OVDRTMR is used to control the duration of the transient heat up mode. When OPR is not greater than 1, OVDTMR is incremented by one, each pass through the routine (Block 210). If OPR is greater than one but not greater than three, Inquiries 204 and 206 and Blocks 212 and 214 cooperate to increment OVDRTMP on alternate passes through the routine for a particular heating unit, effectively reducing the increment rate by two thereby extending the duration of the Instant On period by a factor of two. If OPR is greater than three, Inquiry 208 and Blocks 216 and 218 cooperate to increment OVDRTMR by one on every fourth pass through this routine for this particular heating unit effectively extending the transient heat up mode by a factor of four.

Thus, the variable OPR serves as here before described to reduce the power level applied during operation of the transient heat up mode at block 190 and also is used to compensate for the lower power level by extending the duration by causing the duration of operation in the instant on mode to be extended to compensate for this lower power setting.

At Inquiry 220 the value of OVDRTMR is compared to the reference value INSTIME established in the hereinbefore described Off Timer routine of FIG. 9. When Inquiry 220 determines that OVDTMR has timed out, the Instant On flag is cleared, OVDRTMR is reset to zero, and the reference variable INSTIME is set to zero.

Figure 11:
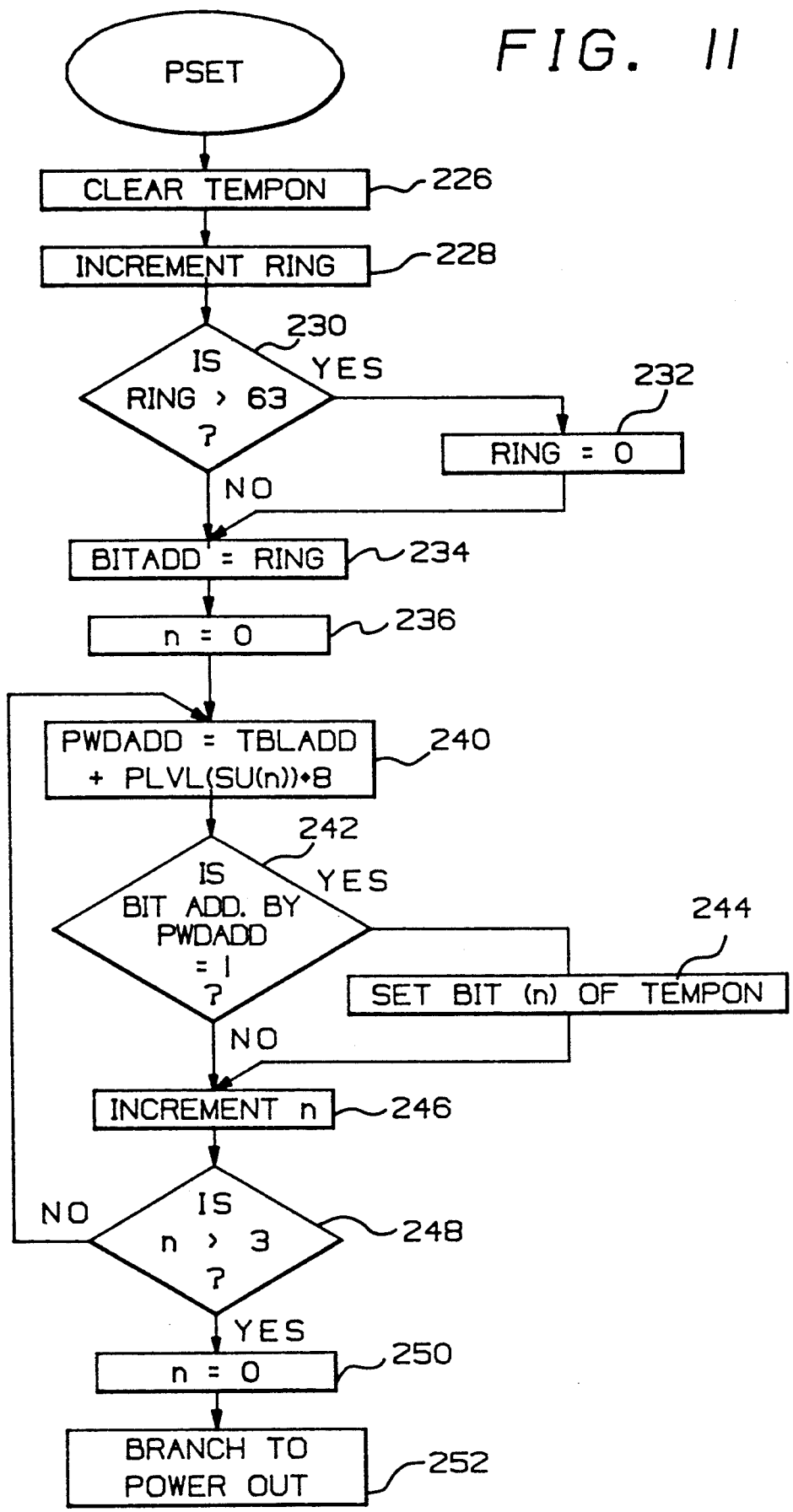
FIG. 11 is a flow diagram of the PSET routine incorporated in the control program of the microprocessor in the circuit of FIG. 6.

PSET Routine - FIG. 11

Having established the appropriate power level to be applied to the heating unit, it remains to make the triac triggering decision for the next occurring power signal cycle. This decision is made for all four heating units during each pass through the control program. Use is made in this routine of information from each of the four heating unit RAM files each time through the routine.

It will be recalled that the power pulse repetition rate for each power level is defined by the bit pattern of a 64 bit word with the logical one bit representing an On cycle and logical zero representing an Off cycle. The bits of the control word for each heating unit represent- ing the power level to be applied to it are tested sequen- tially with one bit being tested each pass through this routine. The state of that tested bit determines whether the triac for the corresponding heating unit will be triggered on or not in the next power signal cycle.

This routine performs a Table Look-Up function to find the appropriate control word for each of the four surface units and then checks the state of the appropri- ate bit in that word. The triac triggering information is then stored in a four-bit word designated TMPON, which is used in the Power Out routine (FIG. 12) to generate the appropriate triac trigger signals.

The variable TBLADD represents the address in PAM of the starting location for the look-up table con- taining the 64 bit control words. The address and associ- ated bit pattern in Hex representation is shown in Table I. Each of the 16 digits in the code as shown for each control word is the hexidecimal representation of four binary bits.

The variable designated BITADD represents the location within the 64 bit control word of the bit to be tested with 0 and 63 corresponding to the location of the most significant bit and least significant bit respec- tively.

An indexing variable n is used to iterate the table look-up loop four times during each pass through the routine, once for each heating unit. The variable PWDADD is the address of the control word repre- senting the power level to be applied to the $n^{th}$ heating unit. As can be seen in Table I, the address for any particular power word is obtained by multiplying the value of PLVL for its associated power level, which is a number 0 through 9, by a factor of 8 and adding this to TBLADD.

Referring to FIG. 11, on entering this routine the control word TMPON is cleared (Block 226) and a ring counter which counts from 0 to 63 is incremented (Block 228). Inquiry 230 determines if the counter is greater than its maximum count of 63. If so, it is reset to 0 (Block 232). Next BITADD is set equal to the count of the ring counter thereby defining the location within the control word for the bit to be tested for each heating unit (Block 234). The same bit location is tested for each of the heating units.

Figure 12:
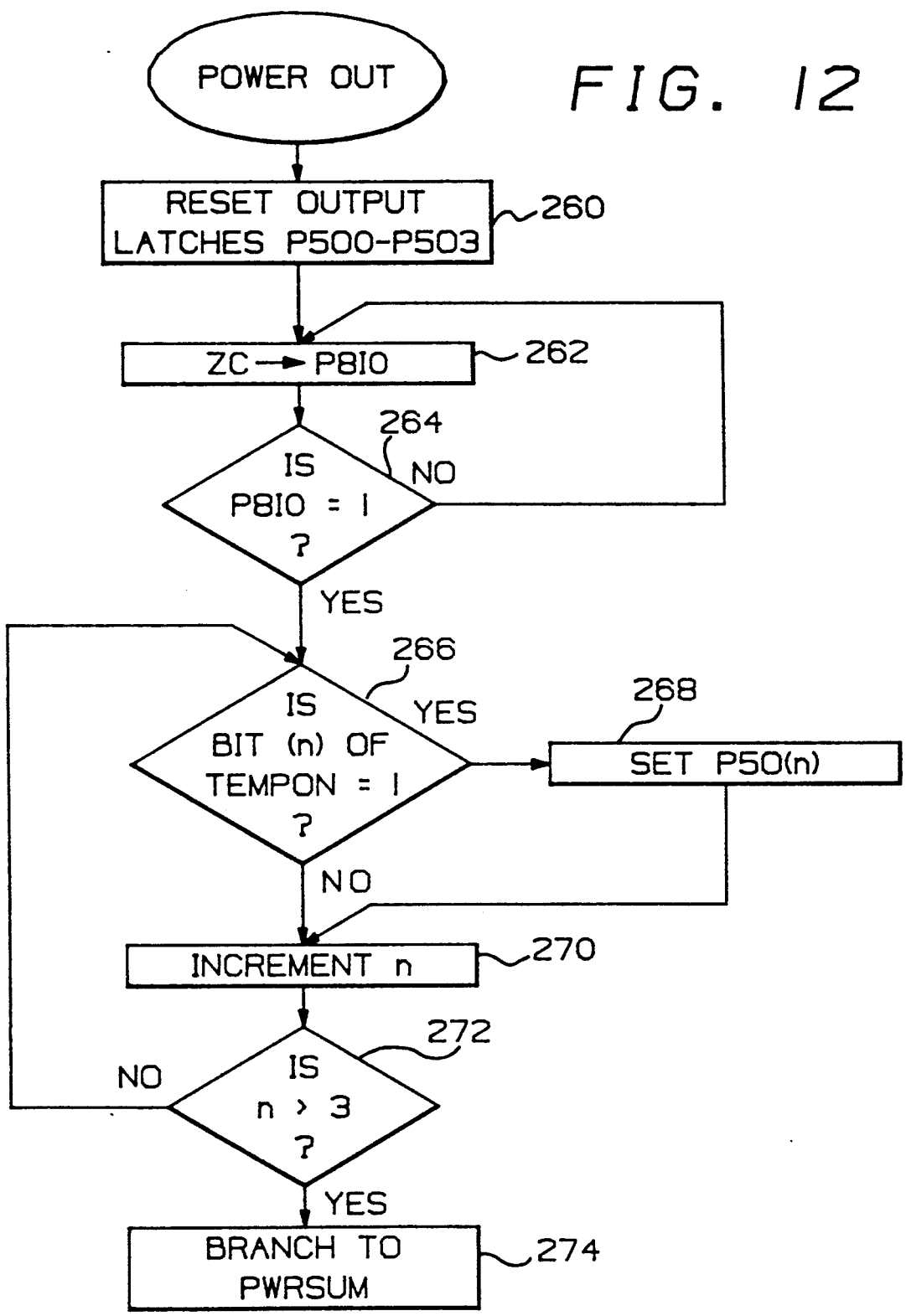
FIG. 12 is a flow diagram of the Power Out routine incorporated in the control program of the microprocessor in the circuit of FIG. 6.

The variable n is initialized to zero at Block 236. PWDADD for the power level to be applied to the $n^{th}$ heating unit is determined at Block 240. The state of the bit location defined by the variable BITADD in the control word located at the address PWDADD is then tested (Inquiry 242). If the tested bit is a logical 1, the $n^{th}$ bit of the control word TMPON is set (Block 244). Otherwise, the $n^{th}$ bit of TMPON will remain 0. After the index n is incremented (Block 246) the value of n is checked (Inquiry 248). If greater than 3, signifying that the loop comprising Blocks 240, 244 and 246 and Inquir- ies 242 and 248 has been iterated four times, n is reset (Block 250) and the program branches (Block 252) to the Power Out routine (FIG. 12). If n is not greater than 3, the program returns to Block 284 to test the bit for the power word for the next heating unit. After the appropriate state for all four bits of the variable TMPON have been established, the program branches (Block 252) to the Power Out routine (FIG. 12).

POWER OUT Routine - FIG. 12

The function of this routine is to trigger triacs 24(a- )-24(d) to implement the triac triggering decision for the next power cycle for each of the four heating units. The triggering of the triacs is synchronized with the positive going zero crossings of the power signal.

Referring now to the routine in FIG. 12, on entering this routine the output latches P500-P503, which con- trol the triacs, are reset (Block 260). Next the program reads in the input from the input port P810 representing the state of the zero cross detector (Block 262) and Inquiry 264 checks the state of this input until it switches to a logical 1 signifying the occurrence of a positive going zero crossing of the power signal. When P810 equals 1, the program proceeds to Inquiry 266 to sequentially check the four bits of the power work TMPON and set the appropriate one of output latches P500-P503. Index variable n is again used to sequen- tially check bits 0 through 3. It will be recalled that prior to branching from the PSET routine the n is reset to 0. Inquiry 266 tests the $n^{th}$ bit for a 1. If it is a 1, the output P50(n) is set (Block 268), n is incremented (Block 270) and Inquiry 272 checks for an n greater than 3. If n is less than 3, the program returns to Inquiry 266 to check the next bit and set the corresponding output port as appropriate. Those ones of output latches P500-P503 associated with bits in the variable TMPON which are in the logical one state are set. Those ones with output latches associated with zero bits in TMPON are not set. In the latter case these latches remain in the reset state since each of the latches is reset upon entering this routine.

In this fashion each bit of the control work TMPON is tested each pass through the Power Out routine. In this way a decision to trigger or not trigger each triac is carried out during each pass through the control pro- gram. Once the loop comprising Inquiries 206 and 272 and Blocks 268 and 270 is iterated four times, once for each heating unit, the power control decision for the next power cycle has been implemented and the pro- gram branches (Block 274) to the PWRSUM Routine of FIG. 13.

Figure 13:
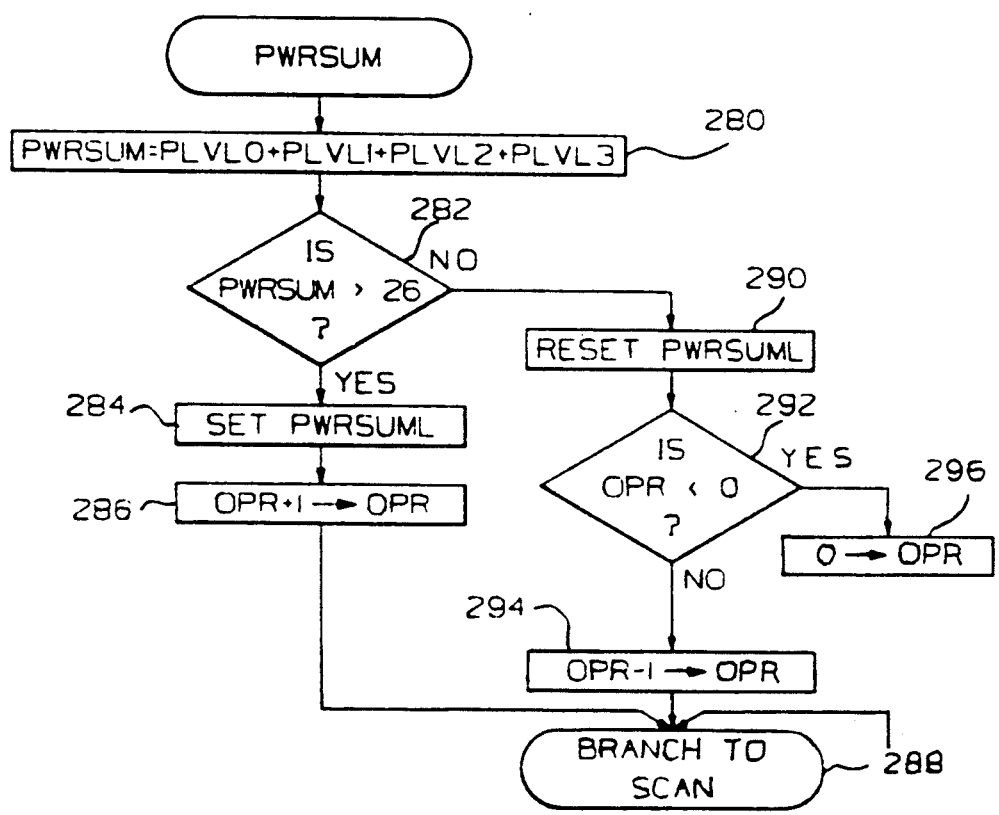
FIG. 13 is a flow diagram of the PWRSUM routine incorporated in the control program of the microprocessor in the circuit of FIG. 6.

PWRSUM Routine - FIG. 13

The function of this routine is to monitor the power levels being applied to each of the heating units and set or reset the latch designated the PWRSUML and up- date as appropriate the variable OPR. It will be recalled that the PWRSUML and the OPR variable are utilized in the Instant On routine to modify the power level being applied to each heating unit as appropriate to bring the total current drawn by the appliance to within acceptable limits. The variable PWRSUM is set equal to the numerical sum of the power level designator for each of the heating units. If this sum is greater than 38, the total current drawn by the appliance will exceed the maximum 35 amp design limit. Thus, if the sum exceeds the reference value of 38, the PWRSUML is set and the variable OPR is increased by one. If the sum of the power levels is not greater than this reference, the PWRSUML is reset and the OPR variable is decremented by one.

Referring to the flow diagram of FIG. 13, on entering the program the variable PWRSUM is set equal to the sum of the power levels (Block 280). This variable is compared to the reference value which is expressed in hexadecimal representation (In hexadecimal the hexadecimal value 26 corresponds to a decimal value of 38.) at Inquiry 282. If PWRSUM exceeds the reference value, PWRSUML is set (Block 284) and the variable OPR is incremented by one (Block 286). If PWRSUM does not exceed the reference, PWRSUML is reset (Block 290). If OPR is less than or equal to 0 at Inquiry 292, the variable is set equal to 0 (Block 296). If OPR is not less than 0, it is decremented by one (Block 294). Having established the appropriate state for PWRSUML and the appropriate value for the variable OPR, the program then returns (Block 288) to the Scan routine of FIG. 7 to repeat the control program for the next heating unit.

While in accordance with the Patent Statutes a specific embodiment of the present invention has been illustrated and described herein, it is realized that numerous modifications and changes will occur to those skilled in the art. For example, the illustrative embodiment employs infrared heating units. However, the invention could also be used in conventional conduction cooktops as well. It is therefore to be understood that the appended claims are intended to cover all such modifications and changes as fall within the true spirit and scope of the invention.

What is claimed is:

1. An electric cooking appliance adapted for energization by a standard domestic household power supply characterized by an output power signal with a predetermined RMS voltage, said cooking appliance comprising:
    at least one electric resistive heating unit designed for steady state energization at a maximum RMS voltage level less than the RMS voltage level of the output power signal of the external power supply;
    user actuable input selection means enabling the user to select one of a plurality of power settings including an OFF setting for said heating unit;
    power control means responsive to said input selection means operative to couple power pulses of predetermined fixed duration from said external power supply to said heating unit at one of a plurality of power pulse repetition rates, each repetition rate establishing a corresponding RMS voltage level for application to said heating unit, each user selectable power setting having associated with it a corresponding one of said plurality of power pulses repetition rates; the repetition rate asssociated with the maximum user selectable power setting effectively applying an RMS voltage level to said heating unit corresponding to the RMS voltage level for which said heating unit is designed, whereby the RMS voltage applied by said heating unit when operating at the power level associated with the maximum user selected power setting is less than the RMS voltage level of the output power signal from the power supply; and
    timing means for measuring the elapsed time since the last occurring user selection of said OFF setting for said heating unit; said power control means further comprising means for detecting the transition from an OFF power setting to one of said non-off power settings said power control means being operative to apply an RMS voltage level equal to the RMS voltage level of the power signal form the power supply to said heating unit for a transient heat up period, upon detection of a transition from said OFF setting to a non-Off power setting, the duration of said transient heat up period being controlled as a function of said elapsed time.

2. The cooking appliance of claim 1 wherein said power controls means is operative to limit the duration of said transient heat up period to a first predetermined period if said elapsed time is less than a predetermined minimum time sufficient to permit said heating unit to cool to near ambient temperature and to otherwise limit the duration of said heat up period to a period greater than said first predetermined period.

3. A heating apparatus comprising:
    at least one electric resistive heating unit adapted for energization by an external standard domestic AC power supply having a predetermined RMS output voltage;
    user actuable input means for enabling the user to select from a plurality of predetermined power settings for said heating unit;
    control means responsive to said user actuable input means, for controlling the output power of said heating unit;
    switch means responsive to said control means for selectively coupling said heating unit to the external power supply;
    said control means being operative to selectively switch said switch means at one of a plurality of switching rates to apply power pulses from said power supply to said heating unit, each pulse comprising one cycle of the AC power signal from the external power supply, each switching rate defining a power pulse repetition rate effective to apply a corresponding RMS voltage level to said heating unit; each of said user selectable power settings having associated with it a corresponding one of said switching rates, the maximum user selectable power setting having a corresponding switching rate which defines an RMS voltage level less than the RMS output voltage whereby the heating unit can be designed to operate at an RMS voltage less than the RMS output voltage of the external power supply;
    said control means further comprising means for detecting the transition from an OFF power setting to a non-OFF power setting and wherein said control means is operative to effectuate a power pulse repetition rate corresponding to an overdrive RMS voltage level higher than that corresponding to the maximum user selectable power setting for a transient heat up period to rapidly heat the unit to its radiant temperature thereby providing visual indicator to the user that said heating unit has been turned On; means for measuring the elapsed time since the entry of the last occurring OFF setting by the user; and means for controlling the duration of the transient heat up period as a function of said elapsed time, to prevent over-heating a heating unit pre-heated from a previous use.

4. The heating apparatus of claim 3 wherein the overdrive RMS voltage level applied to said heating unit during the transient heat up period equals the TMS output supply voltage.

5. The heating apparatus of claim 3 wherein said means for limiting the duration of the transient heat up period comprises means for comparing said elapsed time to a predetermined reference time and means for controlling the duration of the transient heat up period to a first predetermined time if the elapsed time is less than said reference time and to a second predetermined time greater than said first predetermined time otherwise.

6. The heating apparatus of claim 3 wherein said means for limiting the duration of the transient heat up period comprises means for comparing said elapsed time to a plurality of successively increasing reference times and means for selectively limiting the duration of the transient heat up period to a corresponding plurality of successively increasing predetermined time periods, the selected one of said time periods corresponding to the longest one of said references to be exceeded.

7. An electric cooking appliance adapted for energization by a standard AC domestic household power supply having an output power signal characterized by a predetermined RMS voltage level, said cooking appliance comprising:
- a plurality of electric resistive heating units designed by steady state energization at a maximum RMS voltage level less than the RMS voltage level of the power signal from a standard domestic household power supply;
- user actuable input selection means for enabling the user to select one of a plurality of available power settings including an Off setting for each of said heating units;
- power control means responsive to said user actuable input means for independently controlling the output power of each of said heating units;
- switch means associated with each of said heating units and responsive to said control means; each of said switch means being operative to selectively couple its associated heating unit to the external power supply;
- said control means being operative to selectively switch each of said switch means at one of a plurality of switching rates, each rate defining a corresponding predetermined RMS voltage level to be applied to the associated one of said heating units; each of said user selectable power settings having associated with it a corresponding one of said switching rates, the maximum user selectable power setting having a corresponding switching rate which establishes an effective RMS voltage level less than the RMS level of the power signal from the power supply, whereby each of said heating units can be designed to operate at an effective steady state RMS voltage less than the RMS level of the power signal from the power supply;
- said control means further comprising means for detecting the transition from an OFF power setting to a non-OFF power setting and said control means being operative to effectuate a switching rate which establishes an overdrive RMS voltage level higher than that corresponding to the maximum user selectable power setting for a transient heat up period to rapidly heat the unit to its radiant temperature thereby providing visual indicator to the user that said heating unit has been turned On;
- said power control means further comprising means for determining when the total current drawn by said heating units is greater than a predetermined limit and means for reducing the effective voltage level applied to each of said heating units to reduce the total current to within acceptable limits.

8. A cooking appliance in accordance with claim 7 wherein each of said repetition rates is assigned a numerical designator; and wherein said means for determining when the total current exceeds a predetermined limit comprises means for computing the sum of the numerical designators corresponding to the pulse repetition rates being applied to each heating unit and comparing said sum to a predetermined reference representative of the maximum acceptable total current for said heating units, and wherein said control means is operative to lower the repetition rates applied to each of said heating units until said sum is less than the said reference value.

9. The cooking appliance of claim 8 wherein said power control means further comprises means for extending the duration of the transient heat up period for a heating unit operating in the transient heat up mode when said control means lowers the repetition rate applied to said heating unit operating in the transient heat up mode to compensate for the reduction in applied voltage level corresponding to the change in repetition rate.

10. An electric cooking appliance adapted for energization by a standard AC domestic household power supply having an output power signal characterized by a predetermined RMS voltage level, said cooking appliance comprising:
- a plurality of electric resistive heating units designed for steady state energization at a maximum RMS voltage level less than the RMS voltage level of the output power signal from the external power supply;
- user actuable input selection means enabling the user to select one of a plurality of power settings including an OFF setting for each of said heating units;
- power control means responsive to said user actuable input means for independently controlling the output power of each of said heating units;
- switch means associated with each of said heating units and responsive to said control means; each of said switch means being operative to selectively couple its associated heating unit to the external power supply;
- said control means being operative to selectively switch each of said switch means at one of a plurality of switching rates, each rate defining a corresponding RMS voltage level to be applied to the associated one of said heating units; each of said user selectable power settings having associated with it a corresponding one of said switching rates, the maximum user selectable power setting having a corresponding switching rate which defines an RMS voltage level less than the RMS level of the power signal from the power supply;
- said power control means further comprising means for determining when the total current drawn by said heating units is greater than a predetermined limit and means for reducing the effective voltage level applied to each of said heating units to reduce the total current to within acceptable limits.

11. A cooking appliance in accordance with claim 10 wherein each of said switching rates is assigned a numerical designator; and wherein said means for determining when the total current exceeds a predetermined limit comprises means for computing the sum of the numerical designators corresponding to the switching rates being applied to each heating unit and comparing said sum to a predetermined reference representative of the maximum acceptable total current for said heating units, and wherein said control means is operative to lower the switching rates applied to each of said heating units until said sum is less than the said reference value.

12. The cooking appliance of claim 10 wherein said power control means further comprises means for detecting the transition from an OFF power setting to a non-OFF power setting and wherein said control means is operative to effectuate a switching rate corresponding to an overdrive RMS voltage level higher than that corresponding to the maximum user selectable power setting for a transient heat up period to rapidly heat the unit to its radiant temperature thereby providing visual indicator to the user that said heating unit has been turned On, and means for extending the duration of the transient heat up period for a heating unit operating in the transient heat up mode when said control means lowers the switching rate applied to said heating unit operating in the transient heat up mode to compensate for the reduction in applied voltage level corresponding to the reduction in switching rate.

* * * * *